(12) United States Patent
Ohara

(10) Patent No.: US 12,590,596 B2
(45) Date of Patent: Mar. 31, 2026

(54) WORKING MACHINE AND CONTROL METHOD THEREFOR

(71) Applicant: Kubota Corporation, Osaka (JP)

(72) Inventor: Shinji Ohara, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 18/966,319

(22) Filed: Dec. 3, 2024

(65) Prior Publication Data

US 2025/0305523 A1 Oct. 2, 2025

(30) Foreign Application Priority Data

Mar. 26, 2024 (JP) ................................. 2024-049920

(51) Int. Cl.
| | |
|---|---|
| *F15B 21/045* | (2019.01) |
| *F15B 21/0427* | (2019.01) |
| *A01B 63/10* | (2006.01) |

(52) U.S. Cl.
CPC ........ *F15B 21/045* (2013.01); *A01B 63/1006* (2013.01); *F15B 21/0427* (2019.01); *F15B 2211/20553* (2013.01); *F15B 2211/30575* (2013.01); *F15B 2211/351* (2013.01); *F15B 2211/6343* (2013.01); *F15B 2211/66* (2013.01); *F15B 2211/6654* (2013.01); *F15B 2211/7052* (2013.01); *F15B 2211/851* (2013.01); *F15B 2211/857* (2013.01)

(58) Field of Classification Search
None
See application file for complete search history.

(56) References Cited

U.S. PATENT DOCUMENTS

| | | | | | |
|---|---|---|---|---|---|
| 5,564,274 | A | * | 10/1996 | Denbraber | ............ F15B 21/045 |
| | | | | | 60/329 |
| 2021/0259147 | A1 | * | 8/2021 | Yamaguchi | ........... F15B 21/045 |
| 2022/0098833 | A1 | * | 3/2022 | Fukuda | ................... E02F 9/226 |

FOREIGN PATENT DOCUMENTS

| | | |
|---|---|---|
| EP | 2093431 A2 | 8/2009 |
| EP | 3009690 A1 | 4/2016 |
| JP | 2018135926 A | 8/2018 |

OTHER PUBLICATIONS

Official Communication issued in corresponding European Patent Application No. 24217079.3, mailed on May 23, 2025, 10 pages.

* cited by examiner

*Primary Examiner* — Michael Quandt
(74) *Attorney, Agent, or Firm* — Keating & Bennett, LLP

(57) ABSTRACT

A working machine includes a driver, a control valve, and a controller. The driver includes a hydraulic actuator and a driven body to be driven by the hydraulic actuator. The control valve regulates a hydraulic fluid to operate the hydraulic actuator. The controller is configured or programmed to control the control valve. Before starting to execute drive control for the driven body, the controller is configured or programmed to perform preliminary control to open the control valve by an opening amount that is less than an opening amount during the drive control.

11 Claims, 11 Drawing Sheets

WORKING MACHINE AND CONTROL METHOD THEREFOR

CROSS REFERENCE TO RELATED APPLICATIONS

This application claims the benefit of priority to Japanese Patent Application No. 2024-049920, filed on Mar. 26, 2024. The entire contents of each of these applications are hereby incorporated herein by reference.

BACKGROUND OF THE INVENTION

1. Field of the Invention

The present invention relates to working machines, such as tractors, and control methods therefor.

2. Description of the Related Art

Japanese Unexamined Patent Application Publication No. 2018-135926 discloses a hydraulic system including a variable displacement hydraulic pump, a valve unit, and a regulator. The valve unit includes multiple control valves for multiple hydraulic actuators. The regulator regulates the delivery flow rate of the variable displacement hydraulic pump so that the differential pressure between the delivery pressure of the variable displacement hydraulic pump and the maximum load pressure of the hydraulic actuators becomes uniform. The regulator mechanically sets the minimum delivery flow rate to be a value larger than zero.

SUMMARY OF THE INVENTION

The hydraulic system disclosed in Japanese Unexamined Patent Application Publication No. 2018-135926 is a closed center load sensing (CCLS) hydraulic system. The delivery flow rate of the variable displacement hydraulic pump is regulated so that the differential pressure, which is known as the LS differential pressure, between the delivery pressure of the variable displacement hydraulic pump and the maximum load pressure of the multiple hydraulic actuators becomes uniform. This hydraulic system is used for, for example, a working machine including an actuator that can raise and lower a working device.

In a working machine including this CCLS hydraulic system, however, the increasing of the delivery pressure of the variable displacement hydraulic pump and the load pressure (maximum load pressure, for example) is delayed under low temperatures. This may fail to generate the LS differential pressure, which is the difference between the delivery pressure of the pump and the maximum load pressure, even if the control current output to a control valve (control valve for an actuator, for example) becomes sufficiently high. This may make it difficult to generate a required flow rate for the control valve. When the LS differential pressure is generated later, if the control current output to the control valve is high, that is, if the required flow rate for the control valve of the actuator is high, a lift arm of the actuator suddenly starts to move, which may lead to the occurrence of a shock. Additionally, hunting may also occur due to a change in the cylinder pressure.

In view of the above-described issue, example embodiments of the present invention provide working machines and control methods therefor that can reduce the occurrence of a shock at a driving start timing of a hydraulic actuator.

A working machine according to an example embodiment of the present invention includes a driver including a hydraulic actuator and a driven body to be driven by the hydraulic actuator, a control valve to regulate a hydraulic fluid to operate the hydraulic actuator, and a controller configured or programmed to control the control valve. Before starting to execute drive control for the driven body, the controller is configured or programmed to perform preliminary control to open the control valve by an opening amount that is less than an opening amount during the drive control.

The preliminary control may be control to limit a flow rate of a hydraulic fluid to be supplied from the control valve to the hydraulic actuator to a second flow rate, which is smaller than a first flow rate, the first flow rate being a target flow rate to execute the drive control.

The preliminary control may include inching flow rate maintaining control to control the control valve to maintain the flow rate of the hydraulic fluid to be supplied from the control valve to the hydraulic actuator to the second flow rate.

The second flow rate may include an inching flow rate which indicates a flow rate of the control valve based on shipping standards.

The inching flow rate maintaining control may include control to make a maintaining period to maintain the second flow rate longer as a temperature of the hydraulic fluid is lower.

The inching flow rate maintaining control may include control to, when the temperature of the hydraulic fluid is a first temperature lower than a prescribed temperature, set the maintaining period to be a first period, and, when the temperature of the hydraulic fluid is a second temperature which is lower than the first temperature, set the maintaining period to be a second period which is longer than the first period.

The controller may be configured or programmed to, when the temperature of the hydraulic fluid is higher than or equal to the prescribed temperature, execute the drive control without performing the inching flow rate maintaining control.

The working machine may include a sensor to detect an operation of the driven body. The controller may be configured or programmed to, if the sensor detects the operation of the driven body within the maintaining period, discontinue performing the inching flow rate maintaining control and switch to the drive control.

If the sensor does not detect the operation of the driven body within the maintaining period, the controller may be configured or programmed to, after the maintaining period has elapsed, finish performing the inching flow rate maintaining control and switch to the drive control.

The working machine may include a temperature sensor to detect the temperature of a hydraulic fluid, and a storage to store in advance a characteristic map representing a relationship between the temperature of a hydraulic fluid and the maintaining period. The controller may be configured or programmed to, by using the characteristic map, determine the maintaining period corresponding to the temperature which is detected by the temperature sensor at a timing of provision of an instruction to drive the driven body.

The controller may be configured or programmed to, even if the temperature of the hydraulic fluid is changed during the maintaining period, not update the maintaining period but keep the maintaining period.

The working machine may include a load sensing system to control a variable displacement hydraulic pump such that a differential pressure calculated by subtracting a load pressure of the hydraulic actuator from a delivery pressure of the variable displacement hydraulic pump becomes uniform, the variable displacement hydraulic pump being included in the load sensing system and being used to deliver a hydraulic fluid.

The driver may include an actuator to raise and lower a working device. The hydraulic actuator may be a lift cylinder. The driven body may be a lift arm to be driven by driving of the lift cylinder.

The drive control for the driven body may include raising control for the lift arm. The controller may be configured or programmed to, before starting the raising control for the lift arm, perform preliminary control to open the control valve by an opening amount that is less than an opening amount during the raising control.

The controller may be configured or programmed to not perform the preliminary control before starting to perform lowering control for the lift arm to lower the lift arm.

A control method according to an example embodiment of the present invention is a control method for a working machine which includes a driver, a control valve, and a controller, the driver including a hydraulic actuator and a driven body to be driven by the hydraulic actuator, the control valve being usable to regulate a hydraulic fluid to operate the hydraulic actuator, the controller being configured or programmed to control the control valve, includes, before starting to execute drive control for the driven body, performing preliminary control by the controller to open the control valve by an opening amount that is less than an opening amount during the drive control.

The above and other elements, features, steps, characteristics and advantages of the present invention will become more apparent from the following detailed description of the example embodiments with reference to the attached drawings.

BRIEF DESCRIPTION OF THE DRAWINGS

A more complete appreciation of example embodiments of the present invention and many of the attendant advantages thereof will be readily obtained as the same becomes better understood by reference to the following detailed description when considered in connection with the accompanying drawings described below.

DETAILED DESCRIPTION OF THE EXAMPLE EMBODIMENTS

Figure 1:
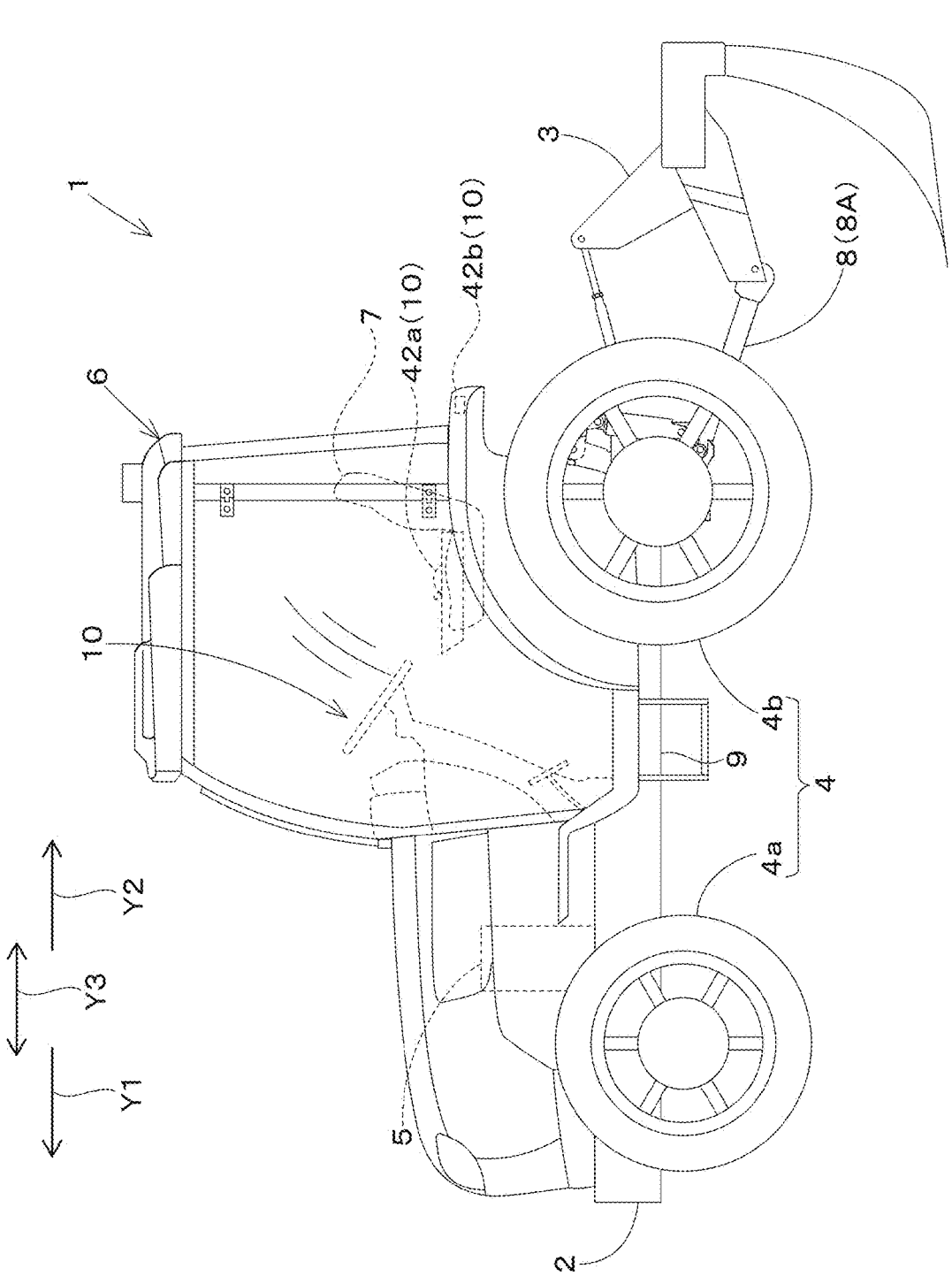
FIG. 1 is a side view of a working machine.

Example embodiments will now be described with reference to the accompanying drawings, wherein like reference numerals designate corresponding or identical elements throughout the various drawings. The drawings are to be viewed in an orientation in which the reference numerals are viewed correctly.

Example embodiments of the present invention will be described below with reference to the accompanying drawings.

Figure 2:
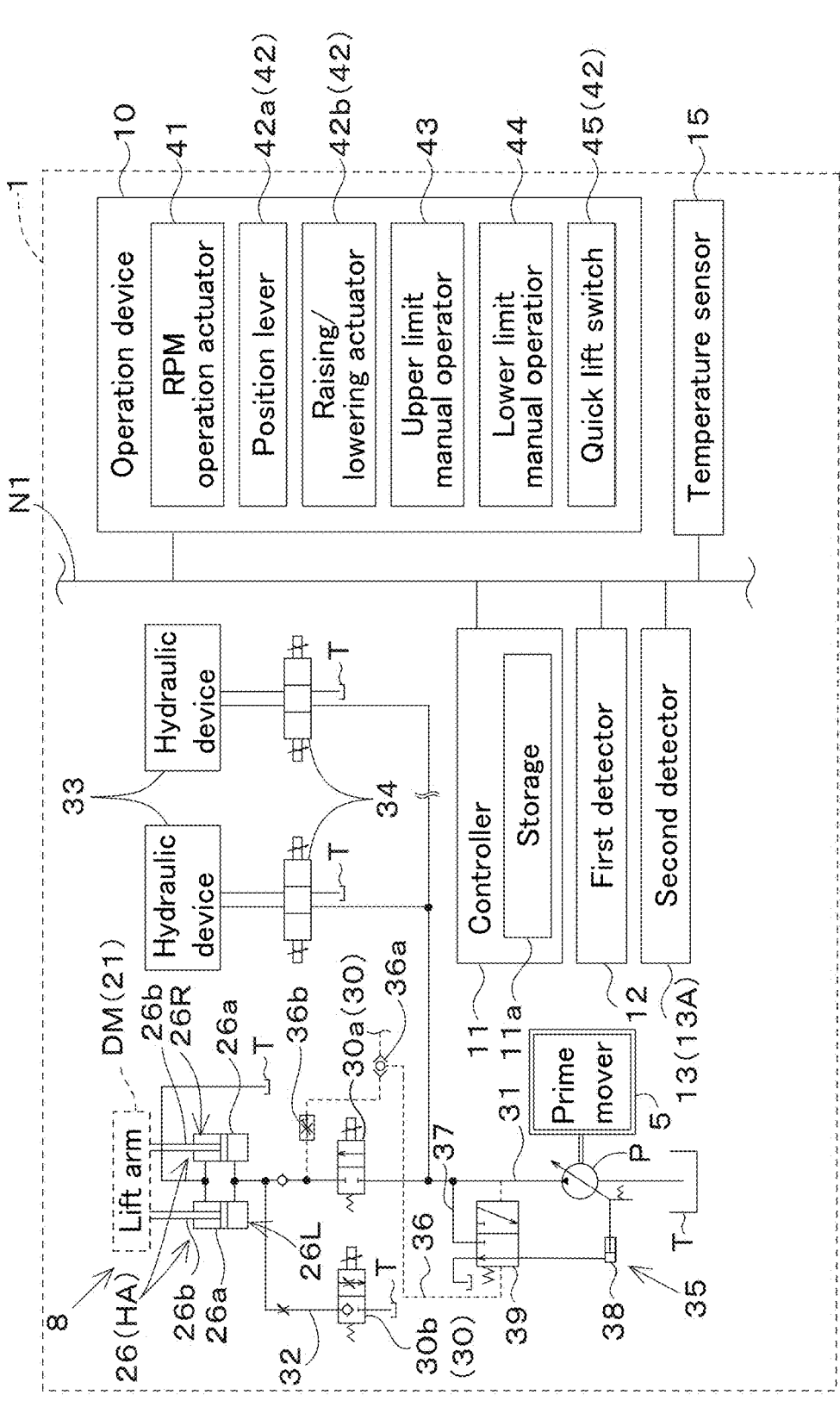
FIG. 2 is a schematic diagram of a control system of the working machine.

First, a working machine 1 will be explained below with reference to FIGS. 1 and 2. FIG. 1 is a side view of the working machine 1 according to the present example embodiment. FIG. 2 is a schematic diagram of a control system included in the working machine 1. As illustrated in FIG. 1, the working machine 1 includes a machine body 2, a working device 3, a traveling device 4, a prime mover 5, a protection mechanism 6, and a driver 8 (actuator 8A, for example).

In the present example embodiment, the facing direction of a user sitting in an operator's seat 7 of the working machine 1 (direction indicated by the arrow Y1 in FIG. 1) is assumed as the front side, while the side opposite the front side (direction indicated by the arrow Y2 in FIG. 1) is assumed as the rear side. The right side of the user (direction indicated by the arrow X2 in FIG. 3) is assumed as the right side, while the left side of the user (direction indicated by the arrow X1 in FIG. 3) is assumed as the left side. The horizontal direction (direction indicated by the arrow X3 in FIG. 3) perpendicular to the front-back direction of the working machine 1 (direction indicated by the arrow Y3 in FIG. 1) is assumed as the width direction of the vehicle body (or the width direction).

The working device 3, which is an implement, for example, is coupled to the rear portion of the machine body 2 and does various types of work. The working device 3 is not limited to a particular type. Examples of the working device 3 may include a digger that digs for potatoes and carrots, a spreader, such as a fertilizer spreader (fertilizer machine) that spreads fertilizer and an agricultural chemical spreader that spreads agricultural chemicals, a seeder that sowing seeds in an agricultural field, a harvester that harvests crops, a mower that mows grass, for example, a tedder that teds grass, for example, a rake that collects grass, for example, a baler that bales grass, for example, and a ground work machine that does ground work for an agricultural field. In FIG. 1, a subsoiler coupled to the rear portion of the machine body 2 is shown as an example of the working device 3.

The traveling device 4 applies a propelling force to the machine body 2. In the example in FIG. 1, the traveling device 4 is a wheeled device including a front wheel 4a and a rear wheel 4b. The traveling device 4 may be a crawler-type device.

The driver 8 is an actuator 8A that raises and lowers the working device 3, for example. The actuator 8A can couple the working device 3 to the machine body 2 and also raise and lower the working device 3 with respect to the machine body 2. The actuator 8A is disposed at the rear portion of the machine body 2. The actuator 8A is a three-point linkage, for example. The working device 3 is attachable to and removable from the actuator 8A. As a result of coupling the working device 3 to the actuator 8A, the machine body 2 can move the working device 3.

The prime mover 5 generates power. The prime mover 5 is a diesel engine or an electric motor, for example. In the present example embodiment, the prime mover 5 includes a diesel engine. A flywheel housing is provided at the back of the prime mover 5. Power output from the prime mover 5 is transmitted to a transmission case 9 provided on the bottom portion of the machine body 2.

As illustrated in FIG. 1, the working machine 1 includes the operator's seat 7 provided on the top portion of the machine body 2. The working machine 1 also includes an operation device 10. The operator's seat 7 is disposed inside the protection mechanism 6, such as a cabin or a canopy. The operation device 10 is installed around the operator's seat 7, for example, and includes a set of devices and members related to operations performed by an operator (user) sitting in the operator's seat 7 for machines, units, instruments, and members (such as the working device 3, traveling device 4, and prime mover 5), for example, provided in the working machine 1. The operation device 10 includes at least a steering wheel, for example.

As illustrated in FIG. 2, multiple devices installed in the working machine 1 are connected to each other by an in-vehicle network N1, such as a CAN (Controller Area Network), ISOBUS, LIN (Local Interconnect Network), or FlexRay. Examples of the devices connected to the in-vehicle network N1 are the prime mover 5, the operation device 10, and a controller 11.

The controller 11 may be an electronic control unit (ECU) and may include a processor, a volatile memory, a nonvolatile memory, and other electronic components and electrical circuits. Examples of the processor are a central processing unit (CPU), a graphics processing unit (GPU), a digital signal processor (DSP), a field programmable gate array (FPGA), and an application specific integrated circuit (ASIC). In the nonvolatile memory of the controller 11, software programs to control the individual elements of the working machine 1 by the processor and various items of data are stored. That is, the controller 11 serves as a controller for the working machine 1.

The controller 11 is configured or programmed to perform various types of control operations for the working machine 1. For example, based on a signal (operation signal) input from the operation device 10, the controller 11 is configured or programmed to operate various devices, such as the working device 3, traveling device 4, and prime mover 5. For example, a first detector 12 that detects the actual revolutions per minute (RPM) of the prime mover 5 is connected to the controller 11. The controller 11 is configured or programmed to control the RPM of the prime mover 5, based on the actual RPM of the prime mover 5 detected by the first detector 12 and an operation signal from an RPM manual operator 41 (such as an accelerator pedal and an accelerator lever), which form the operation device 10. The first detector 12 outputs a signal indicating the detected RPM (RPM signal) to the controller 11.

As shown in FIG. 2, the controller 11 includes a storage 11a. The storage 11a is a nonvolatile memory, for example, and stores various items of information. The storage 11a stores various application software programs, for example. The storage 11a may be an external storage, such as a hard disk drive (HDD) or a solid state drive (SSD), located outside the controller 11 and connected to the in-vehicle network N1.

Figure 3:
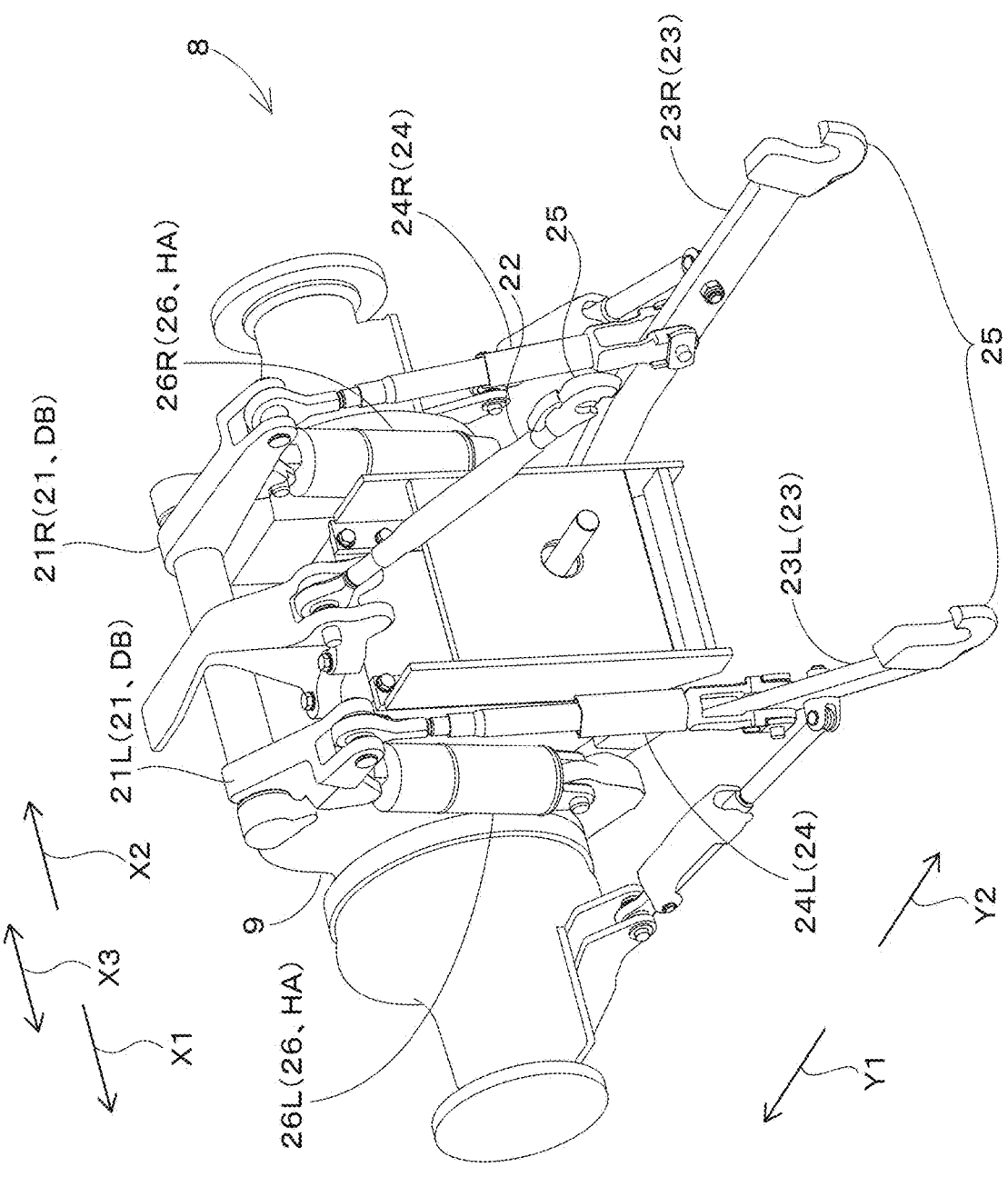
FIG. 3 is a perspective view of an actuator as seen from the left rear portion thereof.
Figure 4:
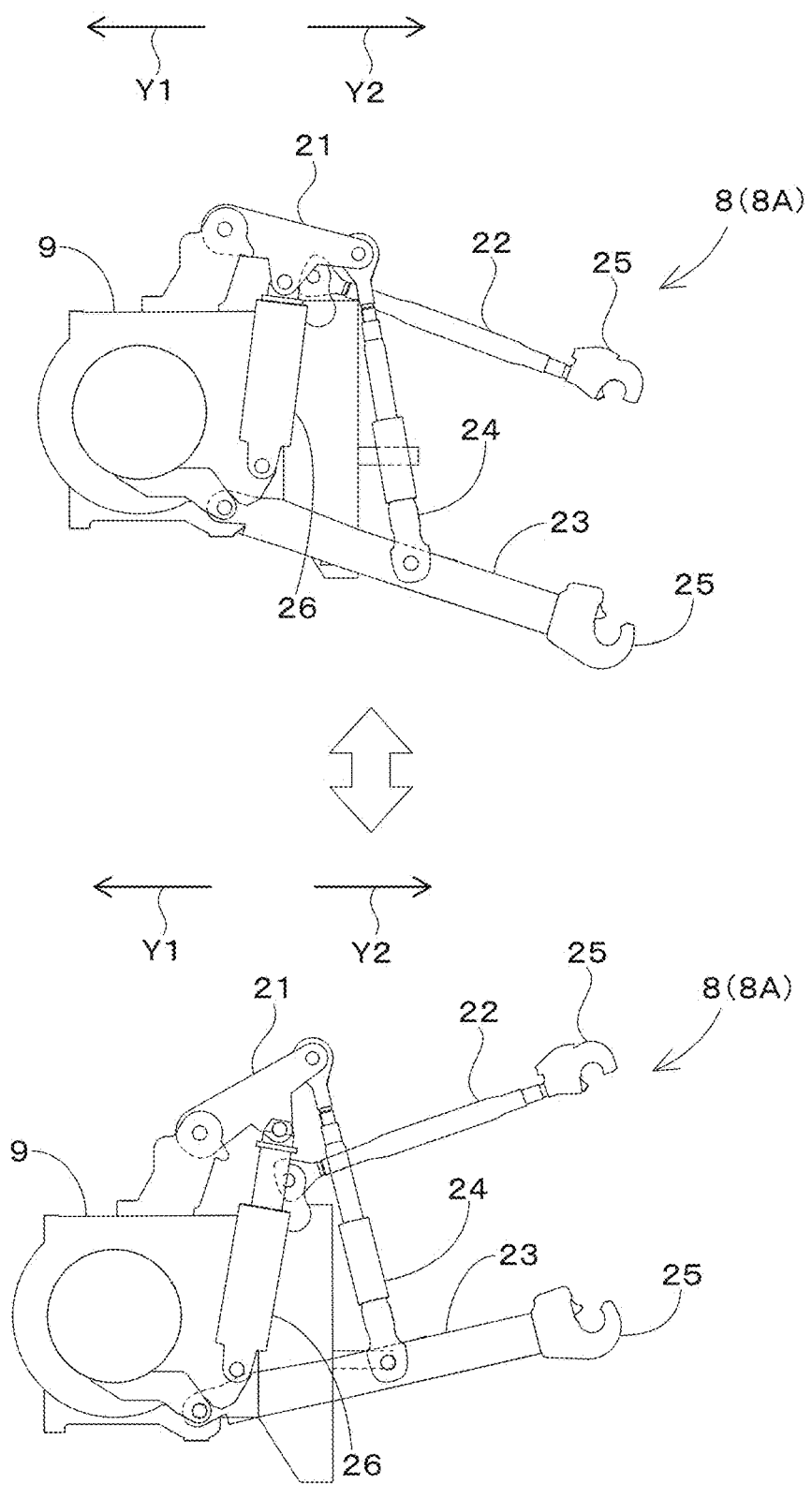
FIG. 4 is a left side view illustrating a raising/lowering operation of the actuator.

The actuator 8A will be explained below in detail. As shown in FIGS. 3 and 4, the actuator 8A is connected to the transmission case 9. FIG. 3 is a perspective view of the actuator 8A as seen from the left rear portion thereof. FIG. 4 is a left side view illustrating a raising/lowering operation of the actuator 8A. As illustrated in FIGS. 3 and 4, the actuator 8A includes lift arms 21, a top link 22, lower links 23, lift rods 24, and lift cylinders 26.

As shown in FIG. 3, the lift arms 21 include a first lift arm 21L and a second lift arm 21R. The first lift arm 21L is disposed on one side (left side) of the width direction of the machine body 2, while the second lift arm 21R is disposed on the other side (right side) of the width direction of the machine body 2. The first lift arm 21L and the second lift arm 21R are pivotably provided on the machine body 2. More specifically, the first lift arm 21L and the second lift arm 21R extend toward the rear side, while the front end portions thereof are supported by the top portion of the transmission case 9.

The top link 22 is disposed between the first lift arm 21L and the second lift arm 21R, and the front end portion of the top link 22 is pivotably supported by the top portion of the transmission case 9. The lower links 23 include a first lower link 23L and a second lower link 23R. The front end portions of the first lower link 23L and the second lower link 23R are pivotably supported by the bottom portion of the transmission case 9. The lift rods 24 include a first lift rod 24L and a second lift rod 24R. The top end portion of the first lift rod 24L is connected to the rear end portion of the first lift arm 21L, and the bottom end portion of the first lift rod 24L is connected to a mid-portion of the first lower link 23L in the longitudinal direction. The top end portion of the second lift rod 24R is connected to the rear end portion of the second lift arm 21R, and the bottom end portion of the second lift rod 24R is connected to a mid-portion of the second lower link 23R in the longitudinal direction.

As illustrated in FIGS. 3 and 4, a joint 25 is provided at the rear end portion of each of the top link 22 and the lower links 23 so as to couple the working device 3 to the machine body 2. By coupling the working device 3 to the rear end portions of the top link 22 and the lower links 23, the working device 3 can be coupled to the rear end portion of the working machine 1 such that it can be raised and lowered. The working device 3 is thus coupled to the lift arm 21 via the lift rods 24 and the lower links 23.

As illustrated in FIGS. 3 and 4, the lift cylinders 26 preferably are hydraulic actuators HA (hydraulic cylinders, for example) operated by a hydraulic fluid. As shown in FIG. 2, the lift cylinder 26 is a single acting cylinder and includes a cylinder tube 26a and a piston rod 26b. One end of the piston rod 26b is slidably inserted into the cylinder tube 26a. The inside of the cylinder tube 26a is partitioned into a bottom-side fluid chamber and a rod-side fluid chamber by a piston movably fitted in the cylinder tube 26a in a direction along the axis (axial direction) of the cylinder tube 26a. With this structure, when a hydraulic fluid is supplied to the bottom-side fluid chamber, the lift cylinder 26 is extended. When a hydraulic fluid is discharged from the bottom-side fluid chamber, the lift cylinder 26 is retracted.

The lift cylinders 26 include a first lift cylinder 26L and a second lift cylinder 26R. One end of the first lift cylinder 26L is connected to the first lift arm 21L, and the other end thereof is connected to the bottom left portion of the transmission case 9. One end of the second lift cylinder 26R is connected to the second lift arm 21R, and the other end thereof is connected to the bottom right portion of the transmission case 9. Driving of the lift cylinder 26 pivots the first lift arm 21L and the second lift arm 21R in the top-bottom direction.

As illustrated in FIG. 2, the working machine 1 includes a hydraulic pump P, control valves 30, hydraulic devices 33, and switching valves 34. The hydraulic pump P is actuated by power generated by the prime mover 5. The hydraulic pump P delivers a hydraulic fluid to operate the driver 8 and other devices included in the working machine 1. The hydraulic pump P delivers a hydraulic fluid stored in a hydraulic fluid tank T. The hydraulic pump P is a variable displacement hydraulic pump P, such as a swash-plate variable displacement axial pump.

The driver 8 includes a hydraulic actuator HA operated by a hydraulic fluid delivered from the hydraulic pump P. The driver 8 includes a driven body DB operated by the driving of the hydraulic actuator HA. The driver 8 is the above-described actuator 8A, for example. That is, the driven body DB is the lift arm 21, and the hydraulic actuator HA is the lift cylinder 26.

The control valve 30 regulates a hydraulic fluid to operate the hydraulic actuator HA. The controller 11 is configured or programmed to control the control valve 30 by supplying a control current thereto. The control valve 30 is energized by a control current output from the controller 11 so as to change its opening to a desired value. This enables the control valve 30 to regulate a hydraulic fluid to operate the hydraulic actuator HA. The control valve 30 is a solenoid control valve, which is a proportional flow rate control valve. As the current value I of a control current output from the controller 11 is greater, the flow rate of a hydraulic fluid to be supplied to the hydraulic actuator HA becomes higher. The controller 11 is configured or programmed to output a control current by executing pulse width modulation (PWM) control, for example.

In the present example embodiment, the control valves 30 include a first control valve 30a (raising control valve) to control the extension of the lift cylinders 26 and a second control valve 30b (lowering control valve) to control the retraction of the lift cylinders 26. The first control valve 30a and the second control valve 30b are connected to the respective lift cylinders 26 for the first lift arm 21L and the second lift arm 21R so as to simultaneously extend or retract the lift cylinders 26, thus simultaneously rising or lowering the first lift arm 21L and the second lift arm 21R.

The first control valve 30a is disposed in a fluid passage (first fluid passage) 31 that connects the hydraulic pump P and the bottom-side fluid chamber. The first control valve 30a changes its opening to supply a hydraulic fluid delivered from the hydraulic pump P to the bottom-side fluid chamber.

The second control valve 30b is disposed in a fluid passage (second fluid passage) 32 that connects the bottom-side fluid chamber and the hydraulic fluid tank T. The second control valve 30b changes its opening to discharge a hydraulic fluid stored in the bottom-side fluid chamber to the hydraulic fluid tank T.

When the opening of the first control valve 30a is changed in response to a control current output from the controller 11, a hydraulic fluid delivered from the hydraulic pump P is supplied to the bottom-side fluid chamber, thus extending the lift cylinder 26 and accordingly raising the lift arm 21. When the opening of the second control valve 30b is changed in response to a control current output from the controller 11, a hydraulic fluid stored in the bottom-side fluid chamber is discharged to the hydraulic fluid tank T so as to make the lift cylinder 26 retractable. Due to the weight of the working device 3 and/or the lift arm 21, the lift cylinder 26 is retracted and the lift arm 21 is lowered accordingly.

The hydraulic system including the control valve 30 is not limited to the above-described configuration if the control valve 30 can control the hydraulic actuator HA. For instance, in the above-described example, the first control valve 30a and the second control valve 30b are connected to the bottom-side fluid chamber. However, the second control valve 30b may be provided in a fluid passage which connects the hydraulic pump P and the rod-side fluid chamber and may change its opening to supply a hydraulic fluid delivered from the hydraulic pump P to the rod-side fluid chamber.

In the above-described example embodiment, the opening of each of the first control valve 30a and the second control valve 30b is changed to control the lift cylinder 26. The control valve 30 is not limited to this configuration. The control valve 30 may be a three-position solenoid switching valve that can be switched between a first position to extend the lift cylinder 26, a second position to stop the driving of the lift cylinder 26, and a third position for retracting the lift cylinder 26.

In the above-described example embodiment, a hydraulic fluid to operate the lift cylinder 26 is controlled directly by the first control valve 30a and the second control valve 30b. This configuration is only an example. The first control valve 30a and the second control valve 30b may cause a control valve connected to the lift cylinder 26 to apply a pilot fluid, and this control valve may regulate a hydraulic fluid to operate the lift cylinder 26. In this manner, the hydraulic system is not limited to the above-described configuration.

The hydraulic devices 33 are devices operated by a hydraulic fluid delivered from the hydraulic pump P. Examples of the hydraulic devices 33 may include a front loader attached to the front portion of the machine body 2, a working portion of the working device 3 operated by a hydraulic fluid, and a power steering mechanism.

The switching valves 34 regulate a hydraulic fluid to operate the hydraulic devices 33. The switching valves 34 are energized by a control current output from the controller 11 so as to change their openings to desired values. The switching valves 34 are solenoid control valves, which are proportional flow rate control valves. As the current value I of a control current output from the controller 11 is greater, the flow rate of a hydraulic fluid to be supplied to the hydraulic devices 33 becomes higher.

The driver 8 may only include the hydraulic actuator HA and the driven body DB. The driver 8 is not limited to the actuator 8A and may be a hydraulic device 33 (such as a front loader or a working portion of the working device 3 operated by a hydraulic fluid). If the driver 8 is a front loader, the hydraulic actuator HA is a boom cylinder and/or a bucket cylinder which operates the front loader. If the driver 8 is a working portion of the working device 3, the hydraulic actuator HA is a hydraulic cylinder or a hydraulic motor, for example, which operates the working portion.

In the above-described example embodiment, the working machine 1 includes the driver 8 provided with the hydraulic actuator HA. However, the working machine 1 may not necessarily include the driver 8 if it includes at least the hydraulic actuator HA operated by a hydraulic fluid delivered from the hydraulic pump P.

As illustrated in FIG. 2, the working machine 1 includes a load sensing system 35. The load sensing system 35 is configured or programmed to control the hydraulic pump P so that the differential pressure, which is known as the LS differential pressure, between the load pressure generated when the hydraulic actuator HA is actuated and the delivery pressure of the hydraulic pump P becomes uniform. That is, the load sensing system 35 controls the delivery amount VF of the hydraulic pump P. In the present example embodiment, the load sensing system 35 is configured or programmed to control the hydraulic pump P so that the LS differential pressure between the load pressure of the hydraulic actuator HA and that of the hydraulic devices 33 and the delivery pressure of the hydraulic pump P becomes uniform. The load sensing system 35 includes a PLS fluid passage 36, a PPS fluid passage 37, a flow rate compensation piston 38, and a flow rate compensation valve 39.

The PLS fluid passage 36 is a passage through which the highest load pressure (maximum load pressure) among the load pressures of the control valves 30 and the switching valves 34 is transmitted to the flow rate compensation valve 39 as a PLS signal pressure. The control valves 30 and the switching valves 34 are connected to the PLS fluid passage 36. In particular, among the control valves 30 and the switching valves 34, the control valve 30 and the switching valve 34 which are connected to the hydraulic pump P to adjust the flow rate of a hydraulic fluid delivered from the hydraulic pump P are connected to the PLS fluid passage 36. For example, as shown in FIG. 2, the first control valve 30a of the control valves 30 to operate the lift cylinder 26 is connected to the PLS fluid passage 36.

A high pressure selection valve 36a is provided in the PLS fluid passage 36 to detect the maximum load pressure from among the load pressures of the control valves 30 and the switching valves 34. Instead of the high pressure selection valve 36a, a check valve may be provided in the PLS fluid passage 36. A pressure compensation valve 36b for the control valves 30 and the switching valves 34 is provided in the PLS fluid passage 36.

The PPS fluid passage 37 is a passage through which the delivery pressure of the hydraulic pump P is transmitted to the flow rate compensation valve 39 as a PPS signal pressure. The PPS fluid passage 37 connects the hydraulic pump P and the flow rate compensation valve 39, and the PPS signal pressure, which is the delivery pressure of a hydraulic fluid from the hydraulic pump P, is applied to the PPS fluid passage 37. The delivery pressure of a hydraulic fluid from the hydraulic pump P is transmitted to the flow rate compensation valve 39.

The flow rate compensation piston 38 acts on a spring which presses a swash plate of the hydraulic pump P to change the angle of the swash plate, thus controlling the delivery amount VF of the hydraulic pump P. In the present example embodiment, the swash plate of the hydraulic pump P is pressed via the spring to increase the delivery amount VF. The flow rate compensation piston 38 also applies a force resistant to the pressing force of the spring to the swash plate. Hence, when the pressure acting on the flow rate compensation piston 38 is released, the angle of the swash plate of the hydraulic pump P becomes the largest and the delivery amount VF is maximized. Conversely, when the pressure acting on the flow rate compensation piston 38 is released, the angle of the swash plate of the hydraulic pump P may become the smallest and the delivery amount VF may be minimized (that is, the delivery amount VF becomes zero).

The flow rate compensation piston 38 is connected to the flow rate compensation valve 39, and the pressure to act on the flow rate compensation piston 38 is controlled by the flow rate compensation valve 39.

The flow rate compensation valve 39 is a valve that can control the flow rate compensation piston 38, based on the PLS signal pressure and the PPS signal pressure. The flow rate compensation valve 39 controls the pressure to act on the flow rate compensation piston 38 so that the pressure difference (differential pressure) between the PPS signal pressure and the PLS signal pressure becomes a predetermined pressure. That is, the flow rate compensation valve 39 controls the pressure to act on the flow rate compensation piston 38 so that the differential pressure calculated by subtracting the PLS signal pressure from the PPS signal pressure becomes uniform.

As described above, the load sensing system 35 changes the angle of the swash plate so that the differential pressure becomes uniform, thus making it possible to adjust the delivery amount VF of the hydraulic pump P regardless of the level of the maximum load pressure. In the present example embodiment, the working machine 1 includes the load sensing system 35. However, the working machine 1 may not necessarily include the load sensing system 35.

The operation of the driver 8 will be described below in detail. The operation device 10 includes an manual operator 42 to operate the driver 8. The manual operator 42 included in the operation device 10 is operable to set a target value (height or angle, for example) corresponding to a target position of the driven body DB. The controller 11 is configured or programmed to calculate a deviation ΔD between a value (height or angle, for example) corresponding to an actual position of the driven body DB and the target value in accordance with the operation of the manual operator 42 so as to control the control valve 30. In the present example embodiment, the controller 11 controls the control valve 30 so that the deviation ΔD becomes zero. In the following description, an explanation will be given, assuming that the manual operator 42 is an actuator to operate the actuator 8A by way of example.

As illustrated in FIG. 2, the working machine 1 includes a second detector 13 to detect the actual position of the lift arm 21. The second detector 13 is a sensor 13A to detect the position of the lift cylinder 26. The second detector 13 is connected to the controller 11 and outputs a detected signal (detection signal) to the controller 11.

In the present example embodiment, the second detector 13 is a sensor 13A to detect the actual angle of the lift arm 21 (lift arm sensor 14, for example). The controller 11 is configured or programmed to control the control valve 30 based on the position of the lift arm 21, such as the angle of the lift arm 21. That is, the controller 11 is configured or programmed to control the control valve 30 so that the deviation (differential angle) AD between the actual angle of the lift arm 21 (detected value) corresponding to the actual position thereof and the target angle of the lift arm 21 (target value) corresponding to the target position thereof becomes zero, thus operating the lift cylinders 26. The lift arm sensor 14 is a rotation displacement variable resistor, such as a potentiometer. The lift arm sensor 14 outputs a signal indicating the detected angle (angle signal) to the controller 11.

The lift arm sensor 14 is not limited to the above-described type and may be another type if it can detect the angle of the lift arm 21. The second detector 13 may be any type of detector if it can detect a parameter to detect the actual position (such as height or angle) of the lift arm 21. For example, the second detector 13 may be a lift cylinder sensor to detect the extension length (stroke) of the lift cylinder 26. In this case, the controller 11 is configured or programmed to control the control valve 30, based on the extension amount of the lift cylinder 26, which is a value corresponding to the position of the lift arm 21. That is, the controller 11 is configured or programmed to control the control valve 30 so that the deviation (differential stroke) AD between the actual extension amount of the lift cylinder 26 (detected value) corresponding to the actual position to the lift arm 21 and the target extension amount of the lift cylinder 26 (target value) corresponding to the target position of the lift arm 21 becomes zero, thus operating the lift cylinders 26.

The controller 11 may be configured or programmed to control the control valve 30, based on the vertical height of the lift arm 21 at a predetermined position (the rear end portion of the lift arm 21, for example) as the position of the lift arm 21. In this case, the controller 11 is configured or programmed to calculate the vertical height of the rear end portion of the lift arm 21, based on the parameter detected by the second detector 13 (the actual angle of the lift arm 21 or the actual extension amount of the lift cylinder 26) and a predetermined expression. The controller 11 is configured or programmed to control the control valve 30 so that the deviation (differential height) AD between the actual height of the rear end portion of the lift arm 21, for example (detected and calculated value) corresponding to the actual position of the lift arm 21 and the target height of the rear end portion of the lift arm 21, for example (target value) corresponding to the target position of the lift arm 21 becomes zero, thus operating the lift cylinders 26.

An explanation will be given below by taking an example in which the manual operator 42 is operable to set the angle of the lift arm 21 that is the value corresponding to the target position of the lift arm 21, and the controller 11 is configured or programmed to control the control valve 30 so that the deviation (differential angle) AD between the actual angle of the lift arm 21 corresponding to the actual position thereof and the target angle of the lift arm 21 corresponding to the target position thereof becomes zero.

The manual operator 42 is a position lever 42a, for example. The position lever 42a, which is a lever that raises and lowers the working device 3, can pivot the working device 3. The position lever 42a is provided with a potentiometer to detect the operation amount of the position lever 42a. The controller 11 can determine the target value (target angle) corresponding to the target position of the lift arm 21, based on an operation signal output from the potentiometer. As the operation amount of the position lever 42a is increased, the controller 11 determines a greater target angle (target value) corresponding to the increased operation amount so as to determine a higher target position. As the operation amount of the position lever 42a is decreased, the controller 11 determines a smaller target angle (target value) corresponding to the decreased operation amount so as to determine a lower target position.

The manual operator 42 is not limited to the position lever 42a and may alternatively be a raising/lowering actuator 42b that raises and lowers the working device 3. Examples of the raising/lowering actuator 42b may include a push button switch, such as a tactile switch, and a seesaw switch. The raising/lowering actuator 42b is connected to the controller 11 and outputs an operation signal to the controller 11. The controller 11 determines the target value corresponding to the target position of the lift arm 21 in accordance with the operation amount of the raising/lowering actuator 42b (the operation period or the number of operation times, for example).

As shown in FIG. 1, the position lever 42a is disposed inside the protection mechanism 6, while the raising/lowering actuator 42b is disposed outside the protection mechanism 6, for example, at a side portion of the actuator 8A, such as on a rear fender.

In the above-described example, the controller 11 determines a certain target position in accordance with the operation amount of the manual operator 42. However, this configuration is only an example. The working machine 1 may include an upper limit manual operator 43 that is operable to determine an upper limit value of the operation amount of the manual operator 42 defining an upper limit position of the lift arm 21, and a lower limit manual operator 44 that is operable to determine a lower limit value of the operation amount of the manual operator 42 defining a lower limit position of the lift arm 21. The manual operator 42 may include a quick lift switch 45 to selectively raise the lift arm 21 to the upper limit position thereof corresponding to the upper limit value of the operation amount or lower the lift arm 21 to the lower limit position thereof corresponding to the lower limit value of the operation amount.

Even if the working machine 1 includes the upper limit manual operator 43 and the lower limit manual operator 44, the controller 11 controls the control valve 30 in accordance with the operation of the manual operator 42, such as the position lever 42a and/or the raising/lowering actuator 42b, so as to operate the lift arm 21 in a range between the lower limit position thereof defined by the determined lower limit value and the upper limit position thereof defined by the determined upper limit value.

The controller 11 calculates the deviation ΔD and controls the control valve 30, based on the relationship between the deviation ΔD and the target flow rate TF of a hydraulic fluid to operate the hydraulic actuator HA and the relationship between the current value I of a control current to be output to the control valve 30 and the flow rate of a hydraulic fluid supplied from the control valve 30.

For example, whenever necessary, the controller 11 determines the current value I of a control current to be output to the control valve 30, based on a first map M1 and a second map M2. The first map M1 is a preset map representing the relationship between the deviation ΔD and the target flow rate TF. The second map is a map representing the relationship between the current value I of a control current to be output to the control valve 30 and the supply amount DF of a hydraulic fluid from the control valve 30. The first map M1 and the second map M2 are store in advanced in the storage 11a.

When the lift arm 21 is raised, the target position becomes higher than the actual position, and the deviation ΔD accordingly becomes a positive value. When the lift arm 21 is lowered, the target position becomes lower than the actual position, and the deviation ΔD accordingly becomes a negative value. For the sake of convenience, an explanation will be given, assuming that the deviation ΔD is the absolute value of the difference between the target position and the actual position.

To raise the lift arm 21 and to lower the lift arm 21, the same first map M1 and the same second map M2 may be used or different first maps M1 and different second maps M2 may be used.

Figure 5:
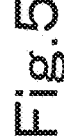
FIG. 5 is a graph illustrating an example of a first map.

FIG. 5 is a graph illustrating an example of the first map M1. In the graph of FIG. 5, the horizontal axis indicates the deviation ΔD between the value corresponding to the actual position and the target value (value corresponding to the target position), and the vertical axis indicates the target flow rate TF of a hydraulic fluid to operate the hydraulic actuator HA. In the example of the first map M1 in FIG. 5, as the deviation ΔD between the value corresponding to the actual position and the target value becomes greater, the target flow rate TF first soars and is then gradually increased.

The first map M1 in FIG. 5 is only an example. As the deviation ΔD between the value corresponding to the actual position and the target value becomes greater, the target flow rate TF may be first gradually increased and then soar, or may be first proportionally increased and then draw a substantially straight line.

Figure 6:
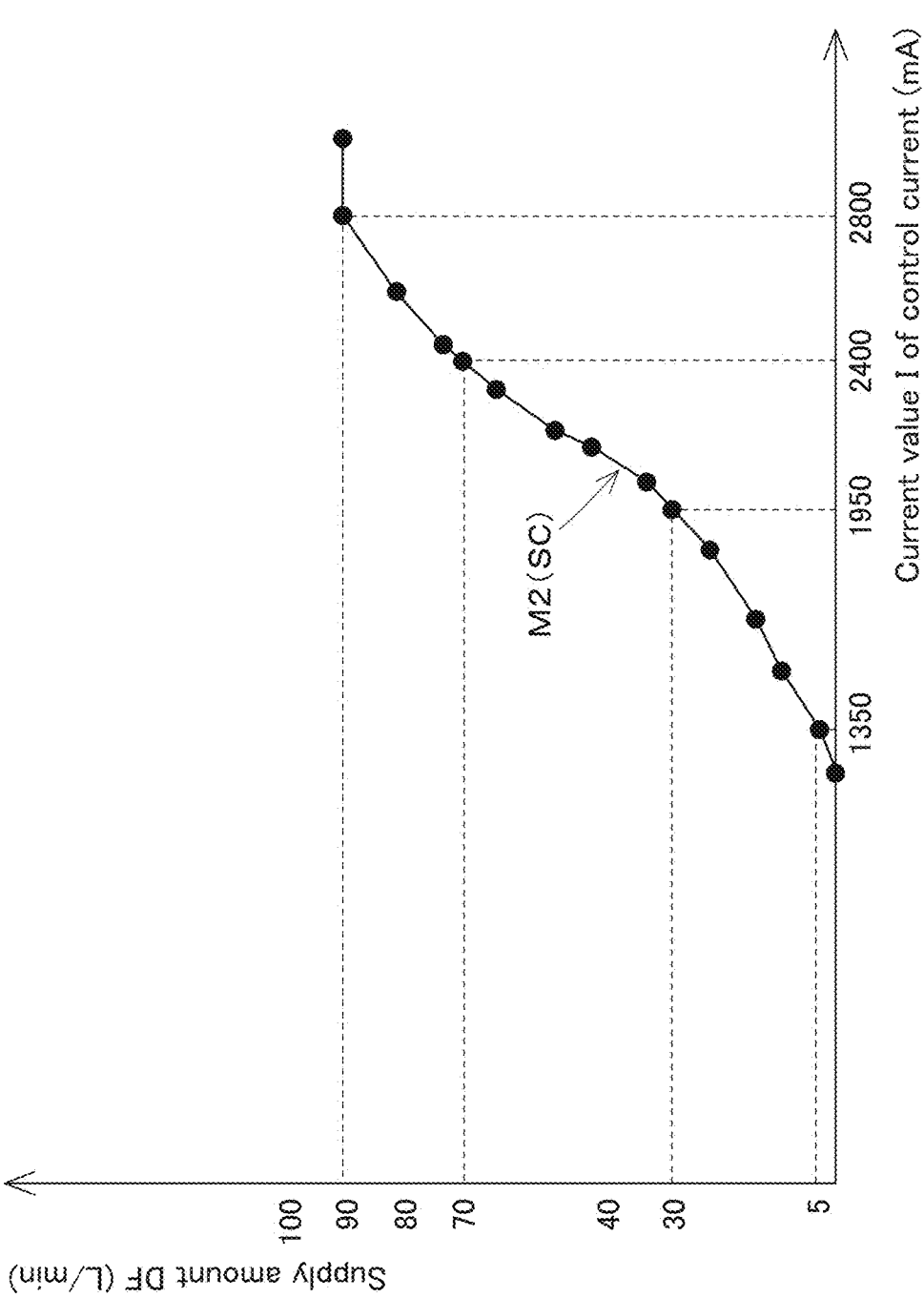
FIG. 6 is a graph illustrating an example of a second map.

FIG. 6 is a graph illustrating the second map M2. The second map M2 is determined based on the standard flow rate characteristics SC of the control valve 30. The standard flow rate characteristics SC represent the relationship between the current value I of a control current to be output to a standard control valve, which is the standard control valve 30, and the flow rate of a hydraulic fluid supplied from the standard control valve. The flow rate of a hydraulic fluid supplied from the standard control valve (supply amount DF) indicated by the standard flow rate characteristics SC is a flow rate of a hydraulic fluid that can be delivered by the standard control valve to which the control current of the current value I is output. The standard control valve is the medium level control valve 30 that is in the medium position in the range in quality thereof between the lowest quality articles and the highest quality articles. That is, the second map M2 is determined based on the flow rate characteristics derived from design data or theoretical data of the standard control valve. The standard flow rate characteristics SC are flow rate characteristics of the standard control valve, such as the flow rate characteristics derived from design data or theoretical data. The standard flow rate characteristics SC are thus flow rate characteristics derived from design data or theoretical data of the standard control valve.

The standard flow rate characteristics SC may be the flow rate characteristics obtained by performing calculation processing, such as averaging or standardizing, on measurement data indicating individual flow rate characteristics of multiple control valves 30. That is, the standard flow rate characteristics SC may be the flow rate characteristics based on multiple items of measurement data. The standard flow rate characteristics SC may be the flow rate characteristics represented by specification data of a standard product, which is the standard control valve 30, presented by a manufacturing company, for example.

In the graph of FIG. 6, the horizontal axis indicates the current value I of a control current, while the vertical axis indicates the supply amount DF. In the example of the second map M2 in FIG. 6, as the current value I of a control current becomes greater, the supply amount DF is first gradually increased and then soars.

The second map M2 shown in FIG. 6 is only an example. The second map M2 may be other than that in FIG. 6 if it is determined based on the flow rate characteristics derived from design data or theoretical data of a certain control valve 30.

The controller 11 is configured or programmed to calculate the deviation ΔD between the value corresponding to the actual position and the target value and then obtains the first map M1 and the second map M2 in accordance with the movement direction (raising or lowering) of the lift arm 21. The controller 11 then determines the target flow rate TF based on the deviation ΔD and the first map M1. The controller 11 then determines the current value I of a control current, based on the target flow rate TF (=supply amount DF) and the second map M2. The controller 11 controls the control valve 30 by outputting a control current having the determined current value I to the control valve 30.

As the deviation ΔD gradually becomes smaller, the controller 11 gradually decreases the current value I of a control current to be output to the control valve 30. When the deviation ΔD becomes zero, the controller 11 sets the current value I to be zero. In this manner, the controller 11 is configured or programmed to control the control valve 30 so as to drive the lift cylinder 26 in accordance with the operation of the manual operator 42.

As discussed above, the controller 11 is configured or programmed to drive the lift cylinder 26 by executing drive control for the driven body DB (lift arm 21, for example).

Before starting drive control (step S5 in FIG. 8, for example, which will be discussed later) for the driven body DB (lift arm 21, for example), preliminary control (step S4 in FIG. 8, for example) is performed to open the control valve 30 by an opening amount which is less compared with that used in drive control.

Preliminary control is control to limit the flow rate of a hydraulic fluid to be supplied from the control valve 30 to the hydraulic actuator HA (lift cylinder 26) to a second flow rate (5 L/min in FIG. 6, for example), which is smaller than a first flow rate (10 to 90 L/min in FIG. 6, for example), which is the target flow rate TF for drive control. For instance, preliminary control is to control the control valve 30 to maintain the flow rate of a hydraulic fluid to be supplied from the control valve 30 to the hydraulic actuator HA to be the second flow rate (such a control operation will be called inching flow rate maintaining control).

The second flow rate is an inching flow rate indicating the flow rate of the control valve 30 based on the shipping standards. The inching flow rate is a delivery start flow rate at the time of shipping at which the operation of the control valve 30 is guaranteed. Moreover, the inching flow rate is a flow rate at which the delivery of a hydraulic fluid is guaranteed when a fixed current (1350 mA, for example) is supplied to the control valve 30. The inching flow rate is a flow rate (5 L/min, for example) in response to the supply of a fixed current (1350 mA, for example). The controller 11 is configured or programmed to output a fixed current (1350 mA, for example) by executing PWM control. The inching flow rate and the fixed current are not limited to 5 L/min and 1350 mA, respectively, and may be different values. The fixed current may be 1400 mA or lower, for example.

The fixed current (control current) in preliminary control (inching flow rate maintaining control) is 1400 mA or lower, preferably, 1350 mA, for example. The control current that can be used in drive control ranges from 1300 to 2800 mA, for example, as illustrated in FIG. 6. The fixed current (1350 mA, for example) in the inching flow rate maintaining control is thus positioned on a lower side of the range (1300 to 2800 mA, for example) of the control current used in drive control. The opening of the control valve 30 becomes larger in proportion to the magnitude of the control current. That is, in preliminary control, the control valve 30 is opened by an opening amount which is less compared with that used in drive control.

The inching flow rate maintaining control is to maintain the second flow rate (that is, the inching flow rate) over a period according to the temperature of a hydraulic fluid. More specifically, the inching flow rate maintaining control is to set a period to maintain the second flow rate to be longer as the temperature of a hydraulic fluid is lower. For example, when the temperature of a hydraulic fluid is a first temperature lower than a prescribed temperature, the period to maintain the second flow rate (hereinafter also called the maintaining period) is set to be a first period. When the temperature of a hydraulic fluid is a second temperature lower than the first temperature, the maintaining period is set to be a second period longer than the first period. When the temperature of a hydraulic fluid is higher than or equal to the prescribed temperature, the maintaining period is set to be zero.

As illustrated in FIG. 2, the working machine 1 includes a temperature sensor 15 to detect the temperature of a hydraulic fluid. For example, the temperature sensor 15 is a fluid temperature sensor disposed inside the transmission case 9 to detect the temperature of a hydraulic fluid inside the transmission case 9, that is, the temperature sensor 15 can be called a transmission fluid sensor. However, the position of the temperature sensor 15 is not limited to the above-described position if it can detect the temperature of a hydraulic fluid. The temperature sensor 15 may be disposed at a certain location, such as in the hydraulic fluid tank T or in a fluid passage for a hydraulic fluid.

Figure 7:
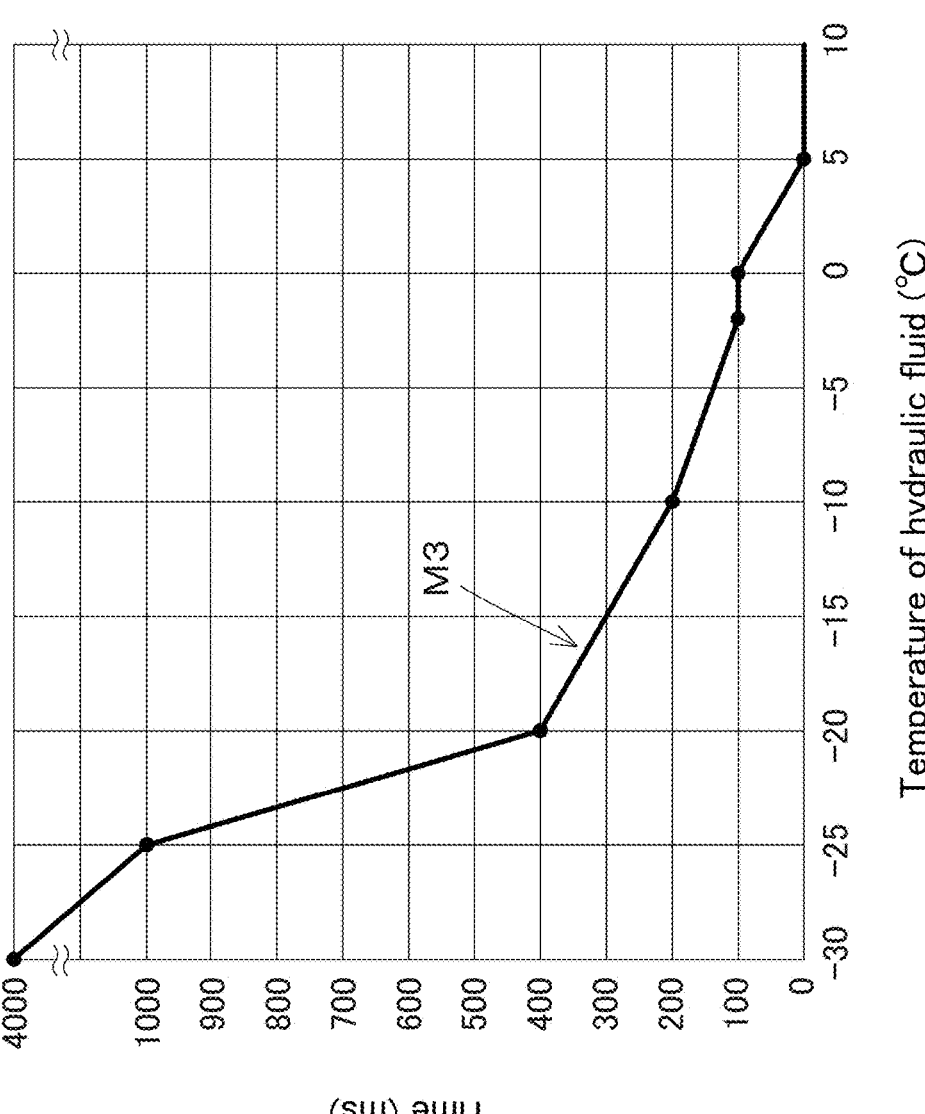
FIG. 7 is a graph illustrating an example of a characteristic map representing the correlation between the temperature of a hydraulic fluid and a maintaining period (waiting period).

The working machine 1 includes a storage 11a that stores in advance a characteristic map M3 representing the correlation between the temperature of a hydraulic fluid and the maintaining period. FIG. 7 is a graph illustrating an example of the characteristic map representing the correlation between the temperature of a hydraulic fluid and the maintaining period (waiting period). By using the characteristic map M3 shown in FIG. 7, the controller 11 is configured or programmed to determine the maintaining period corresponding to the temperature detected by the temperature sensor 15 at a timing at which an instruction to drive the driven body DB is provided (driving instruction timing). The characteristic map M3 indicates the maintaining period corresponding to the temperature of a hydraulic fluid. In the graph of FIG. 7, the horizontal axis indicates the temperature of a hydraulic fluid, and the vertical axis indicates the maintaining period (time).

As illustrated in FIG. 7, when the temperature of a hydraulic fluid detected at the driving instruction timing is a prescribed temperature ($+5°$ C., for example) or higher, the controller 11 determines the maintaining period (waiting period) to be zero ($=0$ ms). When the temperature of a hydraulic fluid is lower than the prescribed temperature, the controller 11 determines the maintaining period accordingly. For example, if the temperature of a hydraulic fluid is $0°$ C., $-10°$ C., $-20°$ C., $-25°$ C., and $-30°$ C., which are all lower than the prescribed temperature, the controller 11 determines the maintaining period (waiting period) to be 100 ms, 200 ms, 400 ms, 1000 ms, and 4000 ms, respectively.

The characteristic map M3 shown in FIG. 7 determines the maintaining period as follows. When the first temperature of a hydraulic fluid, which is lower than the prescribed temperature ($+5°$ C., for example), is set to be $-10°$ C., the maintaining period is set to be the first period (200 ms, for example), for example. When the second temperature is set to be $-20°$ C., the maintaining period is set to be the second period (400 ms, for example), for example. The first temperature and the second temperature may be other than $-10°$ C. and $-20°$ C., respectively, for example. The first period and the second period may be other than 200 ms and 400 ms, respectively, for example.

When the temperature of a hydraulic fluid is higher than or equal to the prescribed temperature, the controller 11 does not perform inching flow rate maintaining control, but executes drive control.

If the sensor 13A, which is used to detect the operation of the driven body (DB) (lift arm 21), has detected the operation of the driven body DB during the maintaining period, the controller 11 discontinues executing inching flow rate maintaining control and switches to drive control.

If the sensor 13A does not detect the operation of the driven body DB during the maintaining period, the controller 11 finishes executing inching flow rate maintaining control after the end of the maintaining period and switches to drive control.

Even if the temperature of a hydraulic fluid is changed during the maintaining period, the controller 11 keeps the maintaining period without updating it. For example, it is now assumed that the temperature of a hydraulic fluid detected by the temperature sensor 15 at a driving instruction timing for the driven body DB is $-25°$ C. and the controller 11 determines the maintaining period to be 1000 ms accordingly, for example. If the temperature of the hydraulic fluid is changed to $-20°$ C. after the lapse of 100 ms after the driving instruction timing, the controller 11 does not update the maintaining period to be 400 ms, which corresponds to $-20°$ C., but keeps the maintaining period at 1000 ms, for example. That is, 900 ms is the remaining maintaining period, for example.

Figure 8:
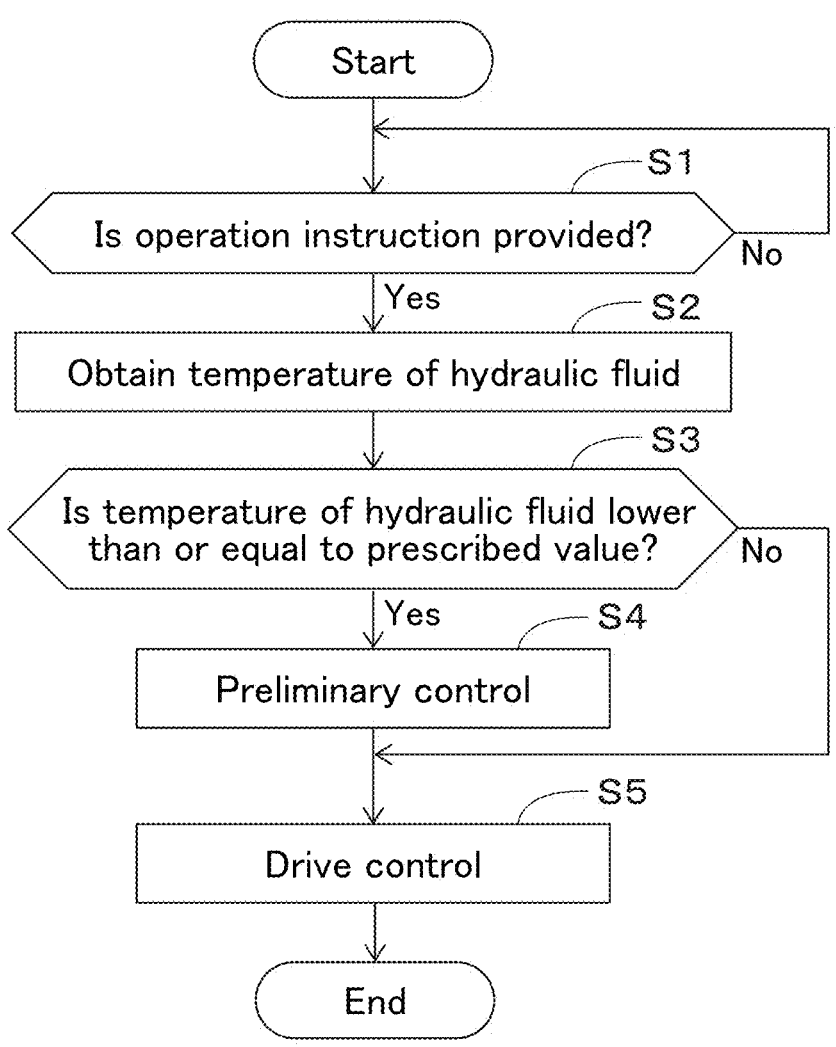
FIG. 8 is a flowchart illustrating processing for reducing the occurrence of a shock at a start timing of driving a driven body.

Drive control for the lift arm 21 and preliminary control to be executed by the working machine 1 will be described below with reference to the flowchart of FIG. 8. FIG. 8 is a flowchart illustrating processing for reducing the occurrence of a shock at a start timing of driving a driven body.

The processing illustrated in FIG. 8 is executed by the processor of the controller 11, based on a software program store in advanced in the storage 11a of the controller 11. In step S1, the controller 11 determines whether an operation instruction is provided from the manual operator 42. For example, the controller 11 determines whether an operation instruction is provided based on an operation signal output from the manual operator 42. If an operation instruction is determined to be provided (Yes in S1), in step S2, the controller 11 obtains the temperature of a hydraulic fluid which is detected by the temperature sensor 15 at a timing at which the operation instruction is provided from the manual operator 42.

The controller 11 then determines in step S3 whether the temperature of the hydraulic fluid is lower than or equal to the prescribed temperature. If the temperature of the hydraulic fluid is determined to be lower than or equal to the prescribed temperature (Yes in S3), the controller 11 executes preliminary control (that is, inching flow rate maintaining control) in step S4. More specifically, the controller 11 executes preliminary control, as illustrated in FIG. 9.

Figure 9:
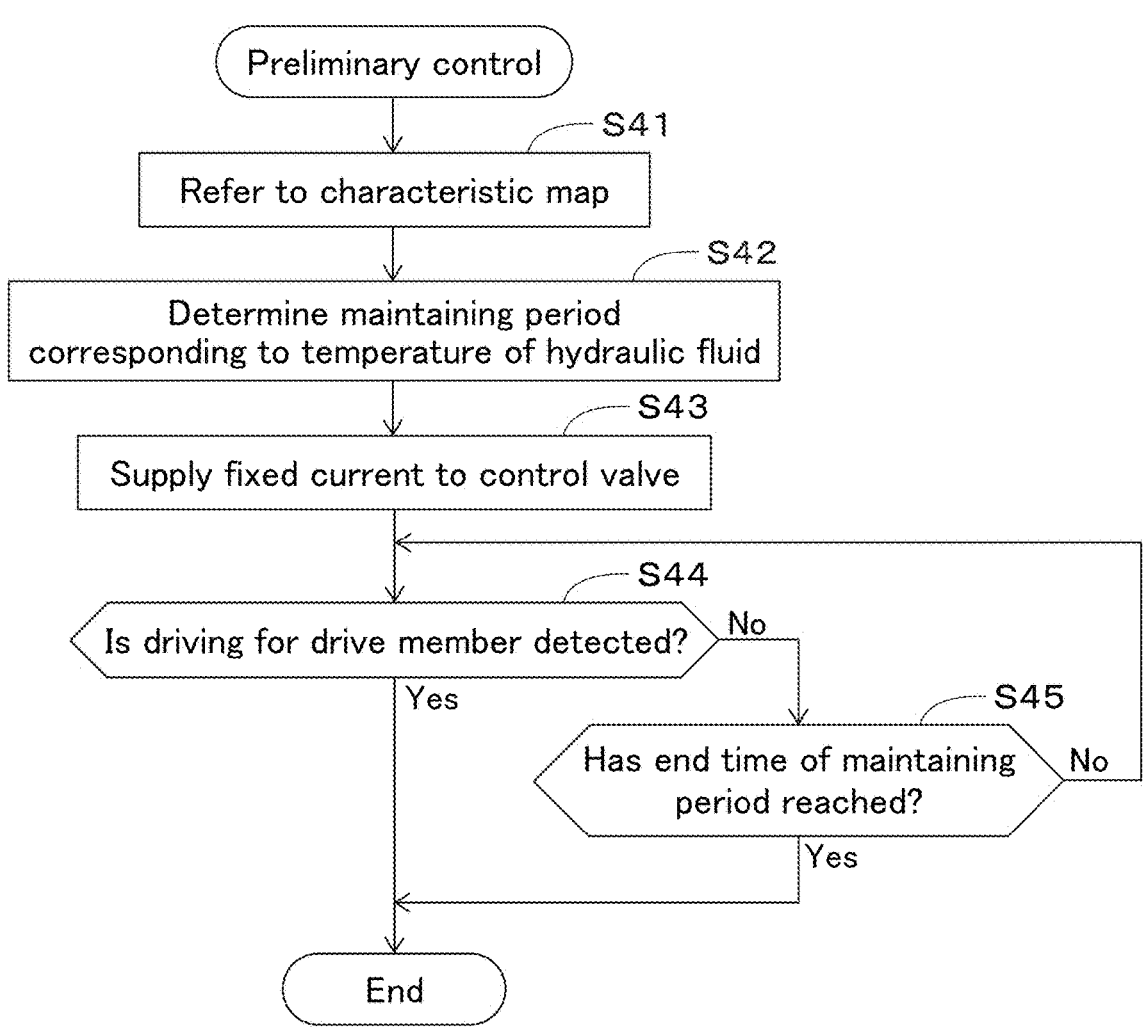
FIG. 9 is a flowchart illustrating preliminary control processing.

FIG. 9 is a flowchart illustrating preliminary control processing. In step S41, the controller 11 refers to the characteristic map M3 shown in FIG. 7 stored in the storage 11a.

In step S42, the controller 11 determines the maintaining period in accordance with the temperature of the hydraulic fluid. For example, by using the characteristic map M3 shown in FIG. 7, the controller 11 determines the maintaining period corresponding to the temperature of the hydraulic fluid obtained by the temperature sensor 15 in step S2 in FIG. 8. The characteristic map M3 in FIG. 7 shows that, if the temperature of a hydraulic fluid detected by the temperature sensor 15 is $-20°$ C., the maintaining period is 400 ms, for example. It is assumed that the maintaining period is determined to be 400 ms, for example.

In step S43, the controller 11 supplies a fixed current (1350 mA, for example) to the control valve 30 over the determined maintaining period (400 ms, for example).

In step S44, the controller 11 determines whether the driving for the driven body DB (lift arm 21) is detected during the maintaining period. For example, if the operation of the driven body DB is detected by the sensor 13A, that is, if it is detected that the driving for the driven body DB is started, the controller 11 determines that the driving for the driven body DB is detected (Yes in S44) and terminates the processing and then proceeds to step S5 in FIG. 8. That is, if the operation of the lift arm 21 is detected by the sensor 13A during the maintaining period, the controller 11 discontinues executing inching flow rate maintaining control in step S4 and switches to drive control in step S5.

If the operation of the driven body DB is not detected by the sensor 13A, the controller 11 determines that the driving for the driven body DB is not detected (No in step S44) and determines in step S45 whether the end time of the maintaining period has reached. That is, the controller 11 determines whether the maintaining period (400 ms) has elapsed after the driving instruction timing. If the end time of the maintaining period has not reached (No in S45), the controller 11 returns to step S44. If the end time of the maintaining period has reached (Yes S45), the controller 11 completes the processing and switches to drive control in step S5 in FIG. 8. That is, when the maintaining period has elapsed, even if the operation of the driven body DB is not detected, the controller 11 finishes executing inching flow rate maintaining control in step S4 and switches to drive control in step S5.

If the driving for the driven body DB is detected as a result of the sensor 13A detecting the operation of the driven body DB (lift arm 21) during the maintaining period (Yes in S44), the controller 11 discontinues executing inching flow rate maintaining control in step S4 and switches to drive control in step S5.

If it is determined in step S3 that the temperature of the hydraulic fluid is higher than the prescribed temperature (No in S3), the controller 11 proceeds to step S5 without executing preliminary control in step S4.

After the execution of preliminary control in step S4 or if it is determined in step S3 that the temperature of the hydraulic fluid is higher than the prescribed temperature (No in S3), the controller 11 is configured or programmed to execute drive control in step S5. For example, the controller 11 is configured or programmed to execute drive control as illustrated in FIG. 10.

Figure 10:
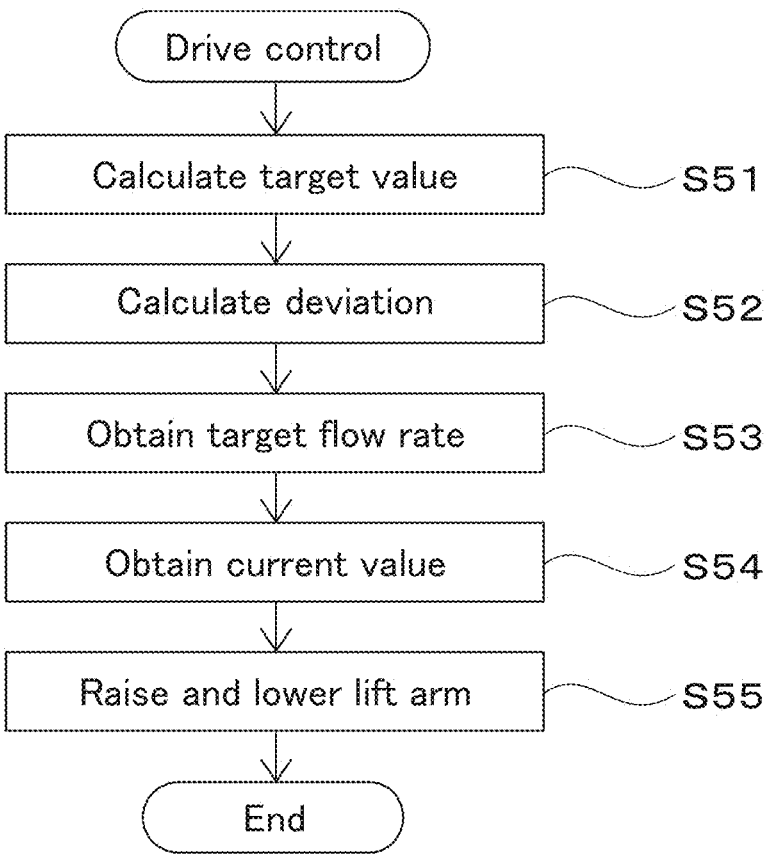
FIG. 10 is a flowchart illustrating drive control processing.

FIG. 10 is a flowchart illustrating drive control processing.

The controller 11 executes drive control to control the control valve 30 to actuate the lift cylinder 26 so that the deviation ΔD between the actual angle of the lift arm 21 corresponding to the actual position thereof and the target angle of the lift arm 21 corresponding to the target position thereof becomes zero.

In step S51, the controller 11 calculates a target value (value corresponding to the target position of the lift arm 21) based on the operation signal output from the manual operator 42 in step S1 in FIG. 8. That is, the controller 11 calculates the target value (target angle of the lift arm 21) corresponding to the operation amount of the manual operator 42.

In step S52, the controller 11 calculates the deviation ΔD based on the value corresponding to the actual position (actual angle of the lift arm 21) and the target value (target angle of the lift arm 21). In step S53, the controller 11 obtains the target flow rate TF based on the deviation ΔD and the first map M1.

After obtaining the target flow rate TF, in step S54, the controller 11 obtains the current value I of a control current, based on the target flow rate TF (=supply amount DF) and the second map M2. In step S55, the controller 11 controls the control valve 30 by outputting a control current having the obtained current value I to the control valve 30 so as to raise and lower the lift arm 21.

In the above-described example embodiment, to raise the actuator 8A when the temperature of a hydraulic fluid is low, inching flow rate maintaining control under low temperatures is performed so that a wait time (that is, the maintaining period shown in FIG. 7) is provided to wait for the increasing of the pressure. With this control operation, the delivery flow rate at a start timing of raising the lift arm 21 is set to a lower flow rate, that is, the inching flow rate (5 L/min). This can reduce the occurrence of a shock (vibration of the vehicle body) and hunting (pressure) caused by an increased delivery flow rate at a start timing of raising the lift arm 21.

That is, when performing control to raise the actuator 8A (hereinafter called the raising control) under low temperatures (−30° C. to +5° C., for example), the controller 11 executes inching flow rate maintaining control for a predetermined period from a start timing of the increasing of a control current so as to wait for the increasing of the pressure. That is, a fixed current (1350 mA, for example) corresponding to a lower flow rate, that is, the inching flow rate (5 L/min), is supplied to the control valve 30 (more precisely, the first control valve 30a). In this manner, as a result of supplying the fixed current to the control valve 30 until the pressure rises, the sudden rising of the lift arm 21, which is caused by delivering a flow rate corresponding to an elevated control current, can be prevented. That is, during the inching flow rate maintaining control period (while the fixed current is supplied), the controller 11 does not start regular raising control. After the lapse of the maintaining period, the controller 11 performs regular raising control, assuming that the pressure is sufficiently increased to generate the differential pressure. If the lift arm 21 is started to move during the maintaining period, the controller 11 discontinues executing inching flow rate maintaining control and shifts to regular raising control.

Before starting the raising control to control the driving for the lift arm 21, the controller 11 may be configured or programmed to execute preliminary control to open the control valve 30 by an opening amount which is less compared with that used in the raising control, but the controller 11 may not necessarily be configured or programmed to execute preliminary control before starting to perform control to lower the lift arm 21 (hereinafter called the lowering control). That is, as illustrated in FIG. 11, the controller 11 does not execute preliminary control before starting the lowering control for the lift arm 21.

Figure 11:
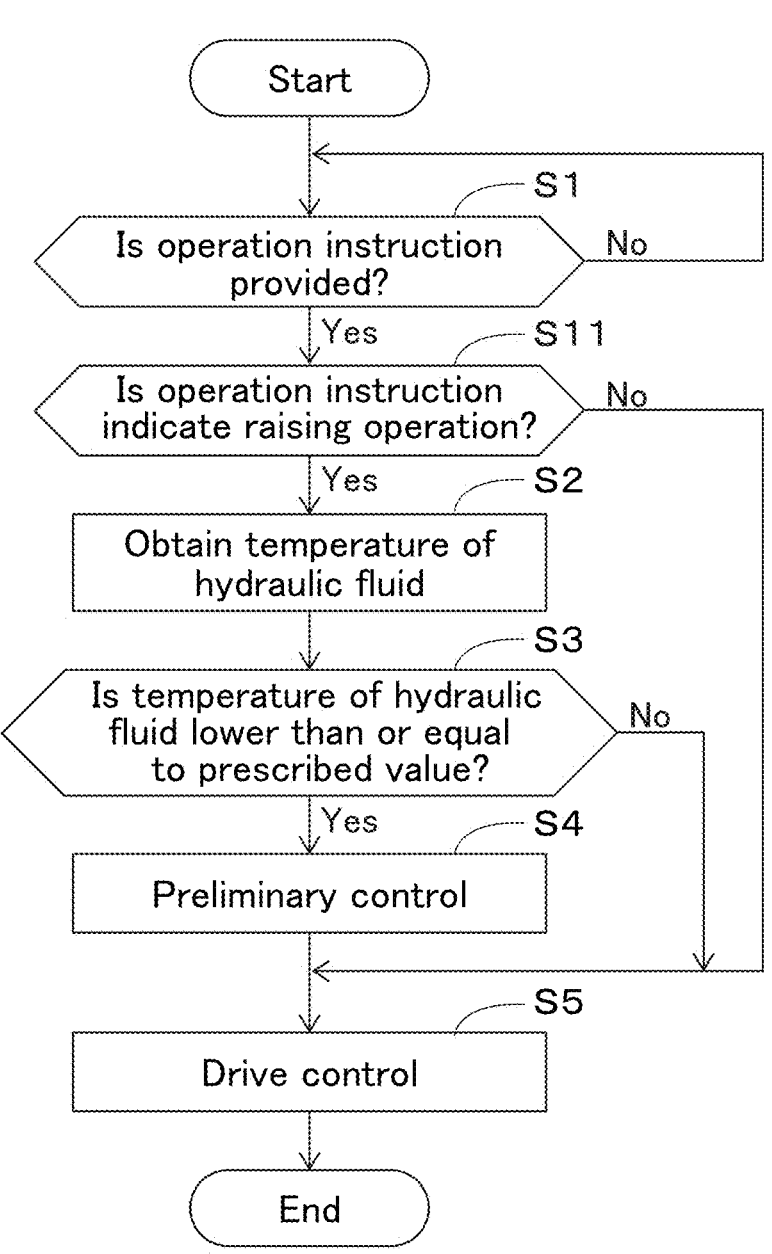
FIG. 11 is a flowchart illustrating processing for reducing the occurrence of a shock at a start timing of raising a driven body.

FIG. 11 is a flowchart illustrating processing for reducing the occurrence of a shock at a start timing of raising a driven body. FIG. 11 is different from FIG. 8 only in that step S11 is added, and step S11 will thus be explained in detail while omitting an explanation of the same steps as those in FIG. 8.

If it is determined that an operation instruction is provided from the manual operator 42 (Yes in S1), the controller 11 determines in step S11 whether the operation instruction from the manual operator 42 indicates a raising operation.

For example, it is now assumed that the manual operator 42 is the position lever 42a or the raising/lowering actuator 42b. If the position lever 42a or the raising/lowering actuator 42b is operated in a direction to indicate a raising operation, the controller 11 determines that the operation instruction indicates a raising operation. If the position lever 42a or the raising/lowering actuator 42b is operated in a direction to indicate a lowering operation, the controller 11 determines that the operation instruction indicates a lowering operation.

If the manual operator 42 is the quick lift switch 45, the controller 11 determines that the operation instruction indicates a raising operation if the quick lift switch 45 is operated in a direction to indicate a raising operation. The controller 11 determines that the operation instruction indicates a lowering operation if the quick lift switch 45 is operated in a direction to indicate a lowering operation.

If the controller 11 determines that the operation instruction from the manual operator 42 indicates a raising operation (Yes in S11), it proceeds to step S2 as in FIG. 8. In this manner, before the start of the raising control for the lift arm 21, the controller 11 executes preliminary control to open the control valve 30 by an opening amount which is less compared with that used in the raising control.

If the controller 11 determines that the operation instruction from the manual operator 42 does not indicate a raising operation (that is, if the operation instruction indicates a lowering operation) (No in S11), it proceeds to step S5 by skipping steps S2 through S4. Hence, preliminary control is not performed before the start of the lowering control for the lift arm 21 because the shock that may occur during the raising operation hardly occurs during the lowering operation. When the opening of the second control valve 30b is changed as a result of the controller 11 outputting a control current to the second control valve 30b, a hydraulic fluid stored in the bottom-side fluid chamber is discharged to the hydraulic fluid tank T. Due to the weight of the working device 3 and/or the lift arm 21, the lift cylinder 26 is retracted and the lift arm 21 is lowered. At this time, a shock is unlikely to occur. When executing the lowering control for the lift arm 21, therefore, preliminary control is not executed unnecessarily.

The characteristic items and advantages of the working machine 1 and the control method therefor according to the above-described example embodiment are as follows.

(Item 1) A working machine (1) includes a driver (8) including a hydraulic actuator (HA) and a driven body (DB) to be driven by the hydraulic actuator (HA), a control valve (30) to regulate a hydraulic fluid to operate the hydraulic actuator (HA), and a controller (11) configured or programmed to control the control valve (30), wherein before starting to execute drive control for the driven body (DB), the controller (11) is configured or programmed to perform preliminary control to open the control valve (30) by an opening amount that is less than an opening amount during the drive control.

With this configuration, before starting to execute drive control for the driven body DB, preliminary control is performed to open the control valve 30 by an opening amount that is less than an opening amount during the drive control. When the temperature of a hydraulic fluid is low, the increasing of the pressure to be applied to the hydraulic actuator HA is delayed. At the increasing timing of the pressure after some delay, the flow rate of a hydraulic fluid to be output to the hydraulic actuator HA is limited to a lower flow rate because the control valve 30 is opened at the less opening amount, thus preventing a high flow rate from being suddenly supplied to the hydraulic actuator HA. It is thus possible to reduce the occurrence of a shock at a driving start timing of the hydraulic actuator HA. It is also possible to lower a change in the pressure (cylinder pressure, for example) of the hydraulic actuator HA, thus reducing the occurrence of hunting of the hydraulic actuator HA caused by such a pressure change.

(Item 2) The working machine 1 according to item 1, wherein the preliminary control includes control to limit a flow rate of a hydraulic fluid to be supplied from the control valve 30 to the hydraulic actuator HA to a second flow rate, which is smaller than a first flow rate, the first flow rate being a target flow rate TF to execute the drive control.

With this configuration, in preliminary control executed before the start of drive control for the driven body DB, the flow rate of a hydraulic fluid to be supplied from the control valve 30 to the hydraulic actuator HA is limited to the second flow rate, which is smaller than the first flow rate. The first flow rate is the target flow rate TF to execute drive control. That is, at the increasing timing of the pressure to be applied to the hydraulic actuator HA after some delay, the flow rate of the hydraulic fluid is limited to the second flow rate, thus preventing a high flow rate (target flow rate TF) from being suddenly supplied to the hydraulic actuator HA. It is thus possible to reduce the occurrence of a shock at a driving start timing of the hydraulic actuator HA.

(Item 3) The working machine 1 according to item 2, wherein the preliminary control includes inching flow rate maintaining control to control the control valve 3 to maintain the flow rate of the hydraulic fluid to be supplied from the control valve 30 to the hydraulic actuator HA to the second flow rate.

With this configuration, before starting drive control for the driven body DB, inching flow rate maintaining control is performed. Hence, at the increasing timing of the pressure to be applied to the hydraulic actuator HA after some delay, the flow rate of the hydraulic fluid is limited to the second flow rate, thus preventing a high flow rate (target flow rate TF) from being suddenly supplied to the hydraulic actuator HA. It is thus possible to reduce the occurrence of a shock at a driving start timing of the hydraulic actuator HA.

The working machine 1 according to item 3, wherein the second flow rate is an inching flow rate which indicates a flow rate of the control valve 30 based on shipping standards.

With this configuration, before starting drive control for the driven body DB, inching flow rate maintaining control is performed to maintain the inching flow rate which indicates a flow rate of the control valve 30 based on shipping standards. Hence, at the increasing timing of the pressure to be applied to the hydraulic actuator HA after some delay, the flow rate of the hydraulic fluid to be supplied from the control valve 30 to the hydraulic actuator HA is limited to the inching flow rate, thus preventing a high flow rate (target flow rate TF) from being suddenly supplied to the hydraulic actuator HA. It is thus possible to reduce the occurrence of a shock at a driving start timing of the hydraulic actuator HA.

The working machine 1 according to item 3, wherein the inching flow rate maintaining control includes control to make a maintaining period to maintain the second flow rate longer as a temperature of the hydraulic fluid is lower.

With this configuration, the maintaining period to maintain the second flow rate in inching flow rate maintaining control becomes longer as the temperature of the hydraulic fluid is lower. The second flow rate can thus be maintained longer to deal with the fact that the increasing of the pressure to be applied to the hydraulic actuator HA is delayed for a longer time as the temperature of the hydraulic fluid becomes lower. Inching flow rate maintaining control can be executed suitably even under low temperatures of a hydraulic fluid. It is thus possible to reduce the occurrence of a shock at a driving start timing of the hydraulic actuator HA even under low temperatures of a hydraulic fluid.

(Item 6) The working machine 1 according to item 5, wherein the inching flow rate maintaining control includes control to, when the temperature of the hydraulic fluid is a first temperature lower than a prescribed temperature, set the maintaining period to be a first period, and when the temperature of the hydraulic fluid is a second temperature which is lower than the first temperature, set the maintaining period to be a second period which is longer than the first period.

With this configuration, when the temperature of the hydraulic fluid is the first temperature, which is lower than the prescribed temperature, the maintaining period to maintain the second flow rate is set to be the first period. When the temperature of the hydraulic fluid is the second temperature, which is lower than the first temperature, the maintaining period is set to be the second period, which is longer than the first period. Hence, when the temperature of the hydraulic fluid is the second temperature, the second flow rate can be maintained longer than when the temperature of the hydraulic fluid is the first temperature so as to deal with a delay in the increasing of the pressure to be applied to the hydraulic actuator HA. Regardless of whether the temperature of the hydraulic fluid is the first temperature lower than the prescribed temperature or the second temperature lower than the first temperature, the flow rate of the hydraulic fluid to be supplied to the hydraulic actuator HA is maintained at the second flow rate when the increasing of the pressure is started after some delay. It is thus possible to reduce the occurrence of a shock at a driving start timing of the hydraulic actuator HA even under low temperatures of a hydraulic fluid.

(Item 7) The working machine 1 according to item 6, wherein the controller 11 is configured or programmed to, when the temperature of the hydraulic fluid is higher than or equal to the prescribed temperature, execute the drive control without performing the inching flow rate maintaining control.

With this configuration, when the temperature of the hydraulic fluid is higher than or equal to the prescribed temperature, a shock does not occur at a driving start timing of the hydraulic actuator HA. Drive control can thus be started immediately without unnecessarily performing inching flow rate maintaining control.

(Item 8) The working machine 1 according to item 5, further including a sensor 13A to detect an operation of the driven body DB, wherein the controller 11 is configured or programmed to, if the sensor 13A detects the operation of the driven body DB within the maintaining period, discontinue performing the inching flow rate maintaining control and switch to the drive control.

With this configuration, when the operation of the driven body DB is detected within the maintaining period, inching flow rate maintaining control is discontinued and is switched to drive control. Drive control can thus be speedily started while reducing the occurrence of a shock at a driving start timing of the hydraulic actuator HA.

(Item 9) The working machine 1 according to item 8, wherein, if the sensor 13A does not detect the operation of the driven body DB within the maintaining period, the controller 11 is configured or programmed to, after the maintaining period has elapsed, finish performing the inching flow rate maintaining control and switch to the drive control.

With this configuration, even if the operation of the driven body (DB) is not detected within the maintaining period, inching flow rate maintaining control is completed after the maintaining period has elapsed and drive control is started.

At the end of the maintaining period, the pressure to be applied to the hydraulic actuator HA is rising, and a differential flow rate, which is a flow rate obtained by subtracting the second flow rate from the required flow rate (target flow rate TF), is merely supplied to the hydraulic actuator HA. Drive control can thus be reliably started while reducing the occurrence of a shock at a driving start timing of the hydraulic actuator HA.

(Item 10) The working machine 1 according to any one of items 5 to 9, further including a temperature sensor 15 to detect the temperature of a hydraulic fluid, and a storage 11a to store in advance a characteristic map M3 representing a relationship between the temperature of a hydraulic fluid and the maintaining period, wherein the controller 11 is configured or programmed to, by using the characteristic map M3, determine the maintaining period corresponding to the temperature which is detected by the temperature sensor 15 at a timing of provision of an instruction to drive the driven body DB.

With this configuration, the maintaining period to maintain the second flow rate in inching flow rate maintaining control can be suitably determined in accordance with the temperature of the hydraulic fluid. It is thus possible to reduce the occurrence of a shock at a driving start timing of the hydraulic actuator HA over a certain temperature range of the hydraulic fluid.

(Item 11) The working machine 1 according to item 10, wherein the controller 11 is configured or programmed to, even if the temperature of the hydraulic fluid is changed during the maintaining period, not update the maintaining period but keep the maintaining period.

If, in inching flow rate maintaining control, the maintaining period is updated in response to a temperature change of the hydraulic fluid during the maintaining period to maintain the second flow rate, the updated maintaining period may become an unsuitable period (shorter period, for example). This may fail to reduce the occurrence of a shock at a driving start timing of the hydraulic actuator HA. With the above-described configuration, the initially determined maintaining period is maintained and is not changed to an unsuitable period (shorter period, for example). It is thus possible to reduce the occurrence of a shock at a driving start timing of the hydraulic actuator HA.

(Item 12) The working machine 1 according to any one of items 1 to 6, further including a load sensing system 35 configured or programmed to control a variable displacement hydraulic pump P such that a differential pressure calculated by subtracting a load pressure of the hydraulic actuator HA from a delivery pressure of the variable displacement hydraulic pump P becomes uniform, the variable displacement hydraulic pump P being included in the load sensing system 35 and being used to deliver a hydraulic fluid.

With this configuration, at the increasing time of the differential pressure, which is known as the LS differential pressure, after some delay, the flow rate of the hydraulic fluid to be supplied to the hydraulic actuator HA is limited to a lower flow rate because the control valve 30 is opened at the less opening amount, thus preventing a high flow rate from being suddenly supplied to the hydraulic actuator HA. It is thus possible to reduce the occurrence of a shock at a driving start timing of the hydraulic actuator HA in the load sensing system 35.

(Item 13) The working machine 1 according to item 12, wherein the driver (8) includes an actuator 8A to raise and lower a working device, the hydraulic actuator HA include a lift cylinder 26, and the driven body DB includes a lift arm 21 to be driven by driving of the lift cylinder 26.

With this configuration, before starting drive control for the lift arm 21, preliminary control is executed to open the control valve 30 by an opening amount which is less compared with that used in drive control. With this control operation, at the increasing time of the pressure to be applied to the lift cylinder 26, that is, at the increasing time of the LS differential pressure after some delay, the flow rate of the hydraulic fluid to be supplied to the lift cylinder 26 is limited to a lower flow rate because the control valve 30 is opened at the less opening amount, thus preventing a high flow rate from being suddenly supplied to the lift cylinder 26. It is thus possible to reduce the occurrence of a shock at a driving start timing for the lift arm 21 (lift cylinder 26) of the actuator 8A. It is also possible to lower a change in the cylinder pressure of the lift cylinder 26, thus reducing the occurrence of hunting of the lift cylinder 26 caused by such a pressure change.

(Item 14) The working machine 1 according to item 13, wherein the drive control for the driven body DB includes raising control for the lift arm 21 to raise the lift arm 21, and the controller 11 is configured or programmed to, before starting the raising control for the lift arm 21, perform preliminary control to open the control valve 30 by an opening amount which is less compared with that used in the raising control.

With this configuration, before starting raising control for the lift arm 21, preliminary control is performed to open the control valve 30 by an opening amount which is less compared with that used in raising control. With this control operation, at the increasing time of the pressure to be applied to the lift cylinder 26, that is, at the increasing time of the LS differential pressure after some delay, the flow rate of the hydraulic fluid to be supplied to the lift cylinder 26 is limited to a lower flow rate because the control valve 30 is opened by the less opening amount, thus preventing a high flow rate from being suddenly supplied to the lift cylinder 26. It is thus possible to reduce the occurrence of a shock at a start timing of raising the lift arm 21 (extending the lift cylinder 26) of the actuator 8A. It is also possible to lower a change in the cylinder pressure of the lift cylinder 26, thus reducing the occurrence of hunting of the lift cylinder 26 caused by such a pressure change.

(Item 15) The working machine 1 according to item 14, wherein the controller 11 is configured or programmed to not perform the preliminary control before starting to perform lowering control for the lift arm 21 to lower the lift arm 21.

With this configuration, when the lift arm 21 of the actuator 8A is lowered by gravity, a shock does not occur, and thus, preliminary control is not performed before starting lowering control for the lift arm 21. In this manner, preliminary control is performed only before executing raising control for the lift arm 21, thus reducing the occurrent of a shock at a start timing of raising the lift arm 21.

(Item 16) A control method for a working machine 1 which includes a driver 8, a control valve 30, and a controller 11, the driver 8 including a hydraulic actuator HA and a driven body DB to be driven by the hydraulic actuator HA, the control valve 30 being usable to regulate a hydraulic fluid to operate the hydraulic actuator HA, the controller 11 being configured or programmed to control the control valve 30, the method including, before starting to execute drive control for the driven body DB, performing preliminary control by the controller 11 to open the control valve 30 by an opening amount that is less than an opening amount during the drive control.

With this method, before starting drive control for the driven body DB, preliminary control is performed to open the control valve 30 by an opening amount which is less compared with that used in drive control. With this operation, at the increasing timing of the pressure to be applied to the hydraulic actuator HA after some delay, the flow rate of the hydraulic fluid to be output to the hydraulic actuator HA is limited to a lower flow rate because the control valve 30 is opened by the less opening amount, thus preventing a high flow rate from being suddenly supplied to the hydraulic actuator HA. It is thus possible to reduce the occurrence of a shock at a driving start timing of the hydraulic actuator HA. It is also possible to lower a change in the pressure (cylinder pressure, for example) of the hydraulic actuator HA, thus reducing the occurrence of hunting of the hydraulic actuator HA caused by such a pressure change.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A working machine comprising:
a driver including a hydraulic actuator and a driven body to be driven by the hydraulic actuator;
a control valve to regulate a hydraulic fluid to operate the hydraulic actuator; and
a controller programmed to control the control valve; wherein
before starting to execute drive control for the driven body, the controller is programmed to perform preliminary control to open the control valve by an opening amount that is less than an opening amount during the drive control;
the preliminary control includes:
control to limit a flow rate of the hydraulic fluid to be supplied from the control valve to the hydraulic actuator to a second flow rate, which is smaller than a first flow rate, the first flow rate being a target flow rate to execute the drive control; and
inching flow rate maintaining control to control the control valve to maintain the flow rate of the hydraulic fluid to be supplied from the control valve to the hydraulic actuator to the second flow rate, and the inching flow rate maintaining control includes control to make a maintaining period to maintain the second flow rate longer as a temperature of the hydraulic fluid is lower; and
the inching flow rate maintaining control includes control to:
when the temperature of the hydraulic fluid is a first temperature lower than a prescribed temperature, set the maintaining period to be a first period; and
when the temperature of the hydraulic fluid is a second temperature which is lower than the first temperature, set the maintaining period to be a second period which is longer than the first period.

2. The working machine according to claim 1, wherein the controller is configured or programmed to, when the temperature of the hydraulic fluid is higher than or equal to the prescribed temperature, execute the drive control without performing the inching flow rate maintaining control.

3. The working machine according to claim 1, further comprising:

a sensor to detect an operation of the driven body; wherein
the controller is programmed to, if the sensor detects the operation of the driven body within the maintaining period, discontinue performing the inching flow rate maintaining control and switch to the drive control.

4. The working machine according to claim 3, wherein, if the sensor does not detect the operation of the driven body within the maintaining period, the controller is programmed to, after the maintaining period has elapsed, finish performing the inching flow rate maintaining control and switch to the drive control.

5. The working machine according to claim 1, further comprising:

a temperature sensor to detect the temperature of a hydraulic fluid; and
a storage to store in advance a characteristic map representing a relationship between the temperature of a hydraulic fluid and the maintaining period; wherein
the controller is programmed to, by using the characteristic map, determine the maintaining period corresponding to the temperature which is detected by the temperature sensor at a timing of provision of an instruction to drive the driven body.

6. The working machine according to claim 5, wherein the controller is programmed to, even if the temperature of the hydraulic fluid is changed during the maintaining period, not update the maintaining period but keep the maintaining period.

7. The working machine according to claim 1, further comprising:

a load sensing system configured or programmed to control a variable displacement hydraulic pump such that a differential pressure calculated by subtracting a load pressure of the hydraulic actuator from a delivery pressure of the variable displacement hydraulic pump becomes uniform, the variable displacement hydraulic pump being included in the load sensing system and being usable to deliver a hydraulic fluid.

8. The working machine according to claim 7, wherein
the driver includes a three-point linkage to raise and lower a working device;
the hydraulic actuator includes a lift cylinder; and
the driven body includes a lift arm to be driven by driving of the lift cylinder.

9. The working machine according to claim 8, wherein:
the drive control for the driven body includes raising control for the lift arm; and
the controller is programmed to, before starting the raising control for the lift arm, perform preliminary control to open the control valve by an opening amount that is less than an opening amount during the raising control.

10. The working machine according to claim 9, wherein in a case where the lift arm is configured to be lowered by its own weight, the controller is programmed to not perform the preliminary control before starting to perform lowering control for the lift arm to lower the lift arm.

11. A control method for a working machine which includes a driver, a control valve, and a controller, the driver including a hydraulic actuator and a driven body to be driven by the hydraulic actuator, the control valve being usable to regulate a hydraulic fluid to operate the hydraulic actuator, the controller being or programmed to control the control valve, the method comprising:

before starting to execute drive control for the driven body, performing preliminary control by the controller to open the control valve by an opening amount that is less than an opening amount during the drive control; wherein
the preliminary control includes:

control to limit a flow rate of the hydraulic fluid to be supplied from the control valve to the hydraulic actuator to a second flow rate, which is smaller than a first flow rate, the first flow rate being a target flow rate to execute the drive control; and
inching flow rate maintaining control to control the control valve to maintain the flow rate of the hydraulic fluid to be supplied from the control valve to the hydraulic actuator to the second flow rate, and the inching flow rate maintaining control includes control to make a maintaining period to maintain the second flow rate longer as a temperature of the hydraulic fluid is lower; and
the inching flow rate maintaining control includes control to:

when the temperature of the hydraulic fluid is a first temperature lower than a prescribed temperature, set the maintaining period to be a first period; and
when the temperature of the hydraulic fluid is a second temperature which is lower than the first temperature, set the maintaining period to be a second period which is longer than the first period.

* * * * *